United States Patent
Donovan et al.

(10) Patent No.: US 11,906,663 B2
(45) Date of Patent: Feb. 20, 2024

(54) NOISE ADAPTIVE SOLID-STATE LIDAR SYSTEM

(71) Applicant: Opsys Tech Ltd., Holon (IL)

(72) Inventors: Mark J. Donovan, Mountain View, CA (US); Larry Fabiny, Boulder, CO (US)

(73) Assignee: Opsys Tech Ltd., Holon (IL)

( * ) Notice: Subject to any disclaimer, the term of this patent is extended or adjusted under 35 U.S.C. 154(b) by 985 days.

(21) Appl. No.: 16/366,729

(22) Filed: Mar. 27, 2019

(65) Prior Publication Data
US 2019/0302246 A1  Oct. 3, 2019

Related U.S. Application Data

(60) Provisional application No. 62/651,209, filed on Apr. 1, 2018.

(51) Int. Cl.
*G01S 7/48* (2006.01)
*G01S 7/481* (2006.01)
(Continued)

(52) U.S. Cl.
CPC .......... *G01S 7/4815* (2013.01); *G01S 7/484* (2013.01); *G01S 7/4817* (2013.01);
(Continued)

(58) Field of Classification Search
None
See application file for complete search history.

(56) References Cited

U.S. PATENT DOCUMENTS 5,157,257 A  10/1992  Geiger
5,552,893 A   9/1996  Akasu
(Continued)

FOREIGN PATENT DOCUMENTS

CN  1512946 A    7/2004
CN  101013030 A  8/2007
(Continued)

OTHER PUBLICATIONS

Notification Concerning Transmittal of International Preliminary Report on Patentability (Chapter I of the Patent Cooperation Treaty) for International Patent Application No. PCT/US2019/024343, dated Oct. 15, 2020, 9 pages, The International Bureau of WIPO, Geneva, Switzerland.

(Continued)

*Primary Examiner* — Hovhannes Baghdasaryan
(74) *Attorney, Agent, or Firm* — Rauschenbach Patent Law Group, PLLC; Kurt Rauschenbach

(57) ABSTRACT

A LIDAR system includes an optical transmitter comprising a plurality of lasers, each illuminating a FOV in an illumination region. A transmitter controller has outputs connected to respective laser inputs. The transmitter controller generates electrical pulses at the outputs so that the lasers generate light in a desired pattern in the illumination region. An optical receiver has an input FOV in the illumination region and comprises a plurality of detectors, each having a FOV and being positioned to detect light over the illumination region; and a TOF measurement circuit that measures the TOF from the lasers to the detectors. The receiver calculates range information. An adaptive optical shutter positioned between the optical transmitter and the optical receiver has a transparent or reflected region FOV, where the optical shutter restricts illumination at the input of the optical receiver to a region which is smaller than the optical receiver FOV.

17 Claims, 15 Drawing Sheets

(51) Int. Cl.
   *G01S 7/4865*  (2020.01)
   *G01S 7/484*  (2006.01)
   *G01S 17/08*  (2006.01)
   *G02B 26/08*  (2006.01)
   *G01S 17/931*  (2020.01)

(52) U.S. Cl.
   CPC ............ *G01S 7/4865* (2013.01); *G01S 17/08* (2013.01); *G01S 17/931* (2020.01); *G02B 26/0833* (2013.01)

(56) References Cited

U.S. PATENT DOCUMENTS

| | | |
|---|---|---|
| 5,909,296 A | 6/1999 | Tsacoyeanes |
| 6,057,909 A | 5/2000 | Yahav et al. |
| 6,061,001 A | 5/2000 | Sugimoto |
| 6,246,708 B1 | 6/2001 | Thornton et al. |
| 6,353,502 B1 | 3/2002 | Marchant et al. |
| 6,680,788 B1 | 1/2004 | Roberson et al. |
| 6,717,972 B2 | 4/2004 | Steinle et al. |
| 6,775,480 B1 | 8/2004 | Goodwill |
| 6,788,715 B1 | 9/2004 | Leeuwen et al. |
| 6,829,439 B1 | 12/2004 | Sidorovich et al. |
| 6,860,350 B2 | 3/2005 | Beuhler et al. |
| 6,888,871 B1 | 5/2005 | Zhang et al. |
| 7,065,112 B2 | 6/2006 | Ghosh et al. |
| 7,110,183 B2 | 9/2006 | von Freyhold et al. |
| 7,544,945 B2 | 6/2009 | Tan et al. |
| 7,652,752 B2 | 1/2010 | Fetzer et al. |
| 7,702,191 B1 | 4/2010 | Geron et al. |
| 7,746,450 B2 | 6/2010 | Willner et al. |
| 7,773,204 B1 | 8/2010 | Nelson |
| 7,969,558 B2 | 6/2011 | Hall |
| 8,072,581 B1 | 12/2011 | Breiholz |
| 8,115,909 B2 | 2/2012 | Behringer et al. |
| 8,247,252 B2 | 8/2012 | Gauggel et al. |
| 8,301,027 B2 | 10/2012 | Shaw et al. |
| 8,576,885 B2 | 11/2013 | Van Leeuwen et al. |
| 8,675,181 B2 | 3/2014 | Hall |
| 8,675,706 B2 | 3/2014 | Seurin et al. |
| 8,783,893 B1 | 7/2014 | Seurin et al. |
| 8,824,519 B1 | 9/2014 | Seurin et al. |
| 9,038,883 B2 | 5/2015 | Wang et al. |
| 9,048,633 B2 | 6/2015 | Gronenborn et al. |
| 9,268,012 B2 | 2/2016 | Ghosh et al. |
| 9,285,477 B1 | 3/2016 | Smith et al. |
| 9,348,018 B2 | 5/2016 | Eisele et al. |
| 9,360,554 B2 | 6/2016 | Retterath et al. |
| 9,378,640 B2 | 6/2016 | Mimeault et al. |
| 9,392,259 B2 | 7/2016 | Borowski |
| 9,516,244 B2 | 12/2016 | Borowski |
| 9,520,696 B2 | 12/2016 | Wang et al. |
| 9,553,423 B2 | 1/2017 | Chen et al. |
| 9,560,339 B2 | 1/2017 | Borowski |
| 9,574,541 B2 | 2/2017 | Ghosh et al. |
| 9,575,184 B2 | 2/2017 | Gilliland et al. |
| 9,658,322 B2 | 5/2017 | Lewis |
| 9,674,415 B2 | 6/2017 | Wan et al. |
| 9,791,557 B1 | 10/2017 | Wyrwas et al. |
| 9,841,495 B2 | 12/2017 | Campbell et al. |
| 9,857,468 B1 | 1/2018 | Eichenholz et al. |
| 9,933,513 B2 | 4/2018 | Dussan et al. |
| 9,946,089 B2 | 4/2018 | Chen et al. |
| 9,989,406 B2 | 6/2018 | Pacala et al. |
| 9,989,629 B1 | 6/2018 | LaChapelle |
| 9,992,477 B2 | 6/2018 | Pacala et al. |
| 10,007,001 B1 | 6/2018 | LaChapelle et al. |
| 10,063,849 B2 | 8/2018 | Pacala et al. |
| 10,191,156 B2 | 1/2019 | Steinberg et al. |
| 10,295,660 B1 | 5/2019 | McMichael et al. |
| 10,488,492 B2 | 11/2019 | Hamel et al. |
| 10,514,444 B2 | 12/2019 | Donovan |
| 10,761,195 B2 | 9/2020 | Donovan |
| 10,928,486 B2 | 2/2021 | Donovan |
| 11,016,178 B2 | 5/2021 | Donovan |
| 11,061,234 B1 | 7/2021 | Zhu et al. |
| 11,320,538 B2 | 5/2022 | Donovan et al. |
| 2002/0117340 A1 | 8/2002 | Stettner |
| 2002/0195496 A1 | 12/2002 | Tsikos |
| 2003/0043363 A1 | 3/2003 | Jamieson et al. |
| 2003/0147652 A1 | 8/2003 | Green et al. |
| 2004/0120717 A1 | 6/2004 | Clark et al. |
| 2004/0228375 A1 | 11/2004 | Ghosh et al. |
| 2005/0025211 A1 | 2/2005 | Zhang et al. |
| 2005/0180473 A1 | 8/2005 | Brosnan |
| 2005/0232628 A1 | 10/2005 | von Freyhold et al. |
| 2006/0132752 A1 | 6/2006 | Kane |
| 2006/0231771 A1 | 10/2006 | Lee et al. |
| 2006/0244978 A1 | 11/2006 | Yamada et al. |
| 2007/0024849 A1 | 2/2007 | Carrig et al. |
| 2007/0071056 A1 | 3/2007 | Chen |
| 2007/0091960 A1 | 4/2007 | Gauggel et al. |
| 2007/0131842 A1 | 6/2007 | Ernst |
| 2007/0177841 A1 | 8/2007 | Dazinger |
| 2007/0181810 A1 | 8/2007 | Tan et al. |
| 2007/0219720 A1 | 9/2007 | Trepagnier et al. |
| 2008/0074640 A1 | 3/2008 | Walsh et al. |
| 2008/0186470 A1 | 8/2008 | Hipp |
| 2009/0027651 A1 | 1/2009 | Pack et al. |
| 2009/0140047 A1 | 6/2009 | Yu et al. |
| 2009/0161710 A1 | 6/2009 | Hoashi et al. |
| 2009/0273770 A1 | 11/2009 | Bauhahn et al. |
| 2009/0295986 A1 | 12/2009 | Topliss et al. |
| 2010/0046953 A1 | 2/2010 | Shaw et al. |
| 2010/0215066 A1 | 8/2010 | Mordaunt et al. |
| 2010/0271614 A1 | 10/2010 | Albuquerque et al. |
| 2010/0302528 A1 | 12/2010 | Hall |
| 2011/0176567 A1 | 7/2011 | Joseph |
| 2011/0216304 A1 | 9/2011 | Hall |
| 2012/0038903 A1 | 2/2012 | Weimer et al. |
| 2013/0088726 A1 | 4/2013 | Goyal et al. |
| 2013/0163626 A1 | 6/2013 | Seurin et al. |
| 2013/0163627 A1 | 6/2013 | Seurin et al. |
| 2013/0206967 A1 | 8/2013 | Shpunt et al. |
| 2013/0208256 A1 | 8/2013 | Mamidipudi et al. |
| 2013/0208753 A1 | 8/2013 | Van Leeuwen et al. |
| 2014/0043309 A1 | 2/2014 | Go et al. |
| 2014/0049610 A1 | 2/2014 | Hudman et al. |
| 2014/0071427 A1 | 3/2014 | Last |
| 2014/0111812 A1 | 4/2014 | Baeg et al. |
| 2014/0139467 A1 | 5/2014 | Ghosh et al. |
| 2014/0160341 A1 | 6/2014 | Tickoo et al. |
| 2014/0218898 A1 | 8/2014 | Seurin et al. |
| 2014/0247841 A1 | 9/2014 | Seurin et al. |
| 2014/0267701 A1 | 9/2014 | Aviv et al. |
| 2014/0303829 A1 | 10/2014 | Lombrozo et al. |
| 2014/0312233 A1 | 10/2014 | Mark et al. |
| 2014/0333995 A1 | 11/2014 | Seurin et al. |
| 2014/0350836 A1 | 11/2014 | Stettner et al. |
| 2014/0376092 A1 | 12/2014 | Mor |
| 2015/0055117 A1 | 2/2015 | Pennecot et al. |
| 2015/0069113 A1 | 3/2015 | Wang et al. |
| 2015/0097947 A1 | 4/2015 | Hudman et al. |
| 2015/0103358 A1 | 4/2015 | Flascher |
| 2015/0109603 A1 | 4/2015 | Kim et al. |
| 2015/0123995 A1 | 5/2015 | Zavodny et al. |
| 2015/0131080 A1 | 5/2015 | Retterath et al. |
| 2015/0160341 A1 | 6/2015 | Akatsu et al. |
| 2015/0219764 A1 | 8/2015 | Lipson |
| 2015/0255955 A1 | 9/2015 | Wang et al. |
| 2015/0260830 A1 | 9/2015 | Ghosh et al. |
| 2015/0260843 A1 | 9/2015 | Lewis |
| 2015/0311673 A1 | 10/2015 | Wang et al. |
| 2015/0316368 A1 | 11/2015 | Moench et al. |
| 2015/0340841 A1 | 11/2015 | Joseph |
| 2015/0362585 A1 | 12/2015 | Ghosh et al. |
| 2015/0377696 A1 | 12/2015 | Shpunt et al. |
| 2015/0378023 A1 | 12/2015 | Royo Royo et al. |
| 2016/0003946 A1 | 1/2016 | Gilliland et al. |
| 2016/0006914 A1 | 1/2016 | Neumann |
| 2016/0025842 A1 | 1/2016 | Anderson et al. |
| 2016/0025993 A1 | 1/2016 | Mor et al. |
| 2016/0033642 A1 | 2/2016 | Fluckiger |
| 2016/0072258 A1 | 3/2016 | Seurin et al. |

(56) References Cited

U.S. PATENT DOCUMENTS

| | | |
|---|---|---|
| 2016/0080077 A1 | 3/2016 | Joseph et al. |
| 2016/0119611 A1 | 4/2016 | Hall et al. |
| 2016/0161600 A1 | 6/2016 | Eldada et al. |
| 2016/0254638 A1 | 9/2016 | Chen et al. |
| 2016/0259038 A1 | 9/2016 | Retterath et al. |
| 2016/0266242 A1 | 9/2016 | Gilliland et al. |
| 2016/0274223 A1 | 9/2016 | Imai |
| 2016/0282468 A1 | 9/2016 | Gruver et al. |
| 2016/0291156 A1 | 10/2016 | Hjelmstad |
| 2016/0306358 A1 | 10/2016 | Kang et al. |
| 2016/0335778 A1 | 11/2016 | Smits |
| 2016/0348636 A1 | 12/2016 | Ghosh et al. |
| 2017/0003392 A1 | 1/2017 | Bartlett et al. |
| 2017/0026633 A1* | 1/2017 | Riza .............. H04N 13/211 |
| 2017/0059838 A1 | 3/2017 | Tilleman |
| 2017/0115497 A1 | 4/2017 | Chen et al. |
| 2017/0131387 A1 | 5/2017 | Campbell et al. |
| 2017/0131388 A1 | 5/2017 | Campbell et al. |
| 2017/0139041 A1 | 5/2017 | Drader et al. |
| 2017/0153319 A1 | 6/2017 | Villeneuve et al. |
| 2017/0168162 A1 | 6/2017 | Jungwirth |
| 2017/0176579 A1 | 6/2017 | Niclass et al. |
| 2017/0181810 A1 | 6/2017 | Tennican |
| 2017/0219426 A1 | 8/2017 | Pacala et al. |
| 2017/0256915 A1 | 9/2017 | Ghosh et al. |
| 2017/0269209 A1 | 9/2017 | Hall et al. |
| 2017/0285169 A1 | 10/2017 | Holz |
| 2017/0289524 A1 | 10/2017 | Pacala et al. |
| 2017/0299722 A1 | 10/2017 | Cuiling et al. |
| 2017/0307736 A1 | 10/2017 | Donovan |
| 2017/0307758 A1 | 10/2017 | Pei et al. |
| 2017/0350982 A1 | 12/2017 | Lipson |
| 2017/0353004 A1 | 12/2017 | Chen et al. |
| 2017/0356740 A1 | 12/2017 | Ansari et al. |
| 2018/0045816 A1 | 2/2018 | Jarosinski et al. |
| 2018/0058923 A1 | 3/2018 | Lipson et al. |
| 2018/0059222 A1 | 3/2018 | Pacala et al. |
| 2018/0062345 A1 | 3/2018 | Bills et al. |
| 2018/0068458 A1 | 3/2018 | Wan et al. |
| 2018/0074198 A1 | 3/2018 | Novak et al. |
| 2018/0107221 A1 | 4/2018 | Droz et al. |
| 2018/0113200 A1 | 4/2018 | Steinberg et al. |
| 2018/0113208 A1 | 4/2018 | Bergeron et al. |
| 2018/0120441 A1 | 5/2018 | Elooz et al. |
| 2018/0128920 A1 | 5/2018 | Keilaf et al. |
| 2018/0136335 A1 | 5/2018 | Kare et al. |
| 2018/0152691 A1 | 5/2018 | Pacala et al. |
| 2018/0167602 A1 | 6/2018 | Pacala et al. |
| 2018/0180720 A1 | 6/2018 | Pei et al. |
| 2018/0180721 A1 | 6/2018 | Pei et al. |
| 2018/0180722 A1 | 6/2018 | Pei et al. |
| 2018/0203247 A1 | 7/2018 | Chen et al. |
| 2018/0209841 A1 | 7/2018 | Pacala et al. |
| 2018/0217236 A1 | 8/2018 | Pacala et al. |
| 2018/0259623 A1 | 9/2018 | Donovan |
| 2018/0259624 A1 | 9/2018 | Kiehn et al. |
| 2018/0259645 A1 | 9/2018 | Shue et al. |
| 2018/0269646 A1 | 9/2018 | Welford et al. |
| 2018/0275248 A1 | 9/2018 | Bailey et al. |
| 2018/0299552 A1 | 10/2018 | Shue et al. |
| 2018/0301872 A1 | 10/2018 | Burroughs et al. |
| 2018/0301874 A1 | 10/2018 | Burroughs et al. |
| 2018/0301875 A1 | 10/2018 | Burroughs et al. |
| 2018/0364334 A1 | 12/2018 | Xiang et al. |
| 2018/0364356 A1 | 12/2018 | Eichenholz et al. |
| 2019/0003429 A1 | 1/2019 | Miyashita |
| 2019/0004156 A1 | 1/2019 | Niclass et al. |
| 2019/0011561 A1 | 1/2019 | Pacala et al. |
| 2019/0011567 A1 | 1/2019 | Pacala et al. |
| 2019/0018115 A1 | 1/2019 | Schmitt et al. |
| 2019/0036308 A1 | 1/2019 | Carson et al. |
| 2019/0049662 A1 | 2/2019 | Thomsen et al. |
| 2019/0056497 A1 | 2/2019 | Pacala et al. |
| 2019/0094346 A1 | 3/2019 | Dumoulin et al. |
| 2019/0098233 A1 | 3/2019 | Gassend et al. |
| 2019/0137607 A1 | 5/2019 | Kostamovaara |
| 2019/0146071 A1 | 5/2019 | Donovan |
| 2019/0170855 A1 | 6/2019 | Keller et al. |
| 2019/0178974 A1 | 6/2019 | Droz |
| 2019/0179018 A1 | 6/2019 | Gunnam et al. |
| 2019/0293954 A1 | 9/2019 | Lin et al. |
| 2020/0018835 A1 | 1/2020 | Pei et al. |
| 2020/0041614 A1 | 2/2020 | Donovan et al. |
| 2020/0081101 A1 | 3/2020 | Donovan |
| 2020/0124732 A1 | 4/2020 | Sutherland et al. |
| 2020/0200874 A1 | 6/2020 | Donovan |
| 2020/0209355 A1 | 7/2020 | Pacala et al. |
| 2020/0278426 A1 | 9/2020 | Dummer et al. |
| 2020/0326425 A1 | 10/2020 | Donovan et al. |
| 2020/0379088 A1 | 12/2020 | Donovan et al. |
| 2020/0386868 A1 | 12/2020 | Donovan et al. |
| 2020/0408908 A1 | 12/2020 | Donovan |
| 2021/0033708 A1 | 2/2021 | Fabiny |
| 2021/0041567 A1 | 2/2021 | Milgrome et al. |
| 2021/0157000 A1 | 5/2021 | Imaki |
| 2021/0181311 A1 | 6/2021 | Donovan |
| 2021/0231779 A1 | 7/2021 | Donovan |
| 2021/0231806 A1 | 7/2021 | Donovan et al. |
| 2021/0234342 A1 | 7/2021 | Donovan |
| 2021/0278540 A1 | 9/2021 | Maayan et al. |
| 2021/0321080 A1 | 10/2021 | Jeong et al. |
| 2022/0146680 A1 | 5/2022 | Donovan et al. |

FOREIGN PATENT DOCUMENTS

| | | |
|---|---|---|
| CN | 101080733 A | 11/2007 |
| CN | 101545582 A | 9/2009 |
| CN | 103633557 A | 3/2014 |
| CN | 104898125 A | 9/2015 |
| CN | 105705964 A | 6/2016 |
| CN | 106464366 A | 2/2017 |
| CN | 109073757 A | 12/2018 |
| CN | 107728156 A | 11/2019 |
| CN | 110402398 A | 11/2019 |
| CN | 110914702 A | 3/2020 |
| CN | 111356934 A | 6/2020 |
| CN | 111919137 A | 11/2020 |
| CN | 112543875 A | 3/2021 |
| CN | 113692540 A | 11/2021 |
| CN | 113906316 A | 1/2022 |
| CN | 113924506 A | 1/2022 |
| CN | 114096882 A | 2/2022 |
| CN | 114174869 A | 3/2022 |
| DE | 197 17 399 A1 | 6/1999 |
| DE | 10103861 A1 | 8/2001 |
| DE | 102007004609 A1 | 8/2007 |
| DE | 102014216390 A1 | 2/2016 |
| DE | 102019005059 A1 | 2/2020 |
| EP | 1160540 A1 | 12/2001 |
| EP | 1444696 B1 | 3/2005 |
| EP | 1569007 A2 | 8/2005 |
| EP | 2656099 A1 | 12/2011 |
| EP | 2656106 A1 | 12/2011 |
| EP | 2775316 A2 | 9/2014 |
| EP | 3168641 B1 | 4/2016 |
| EP | 3497477 A1 | 8/2016 |
| EP | 2656100 A1 | 10/2016 |
| EP | 3526625 A1 | 11/2016 |
| EP | 3 159 711 A1 | 4/2017 |
| EP | 3446153 A2 | 2/2019 |
| EP | 3596492 A1 | 1/2020 |
| EP | 3658949 A1 | 6/2020 |
| EP | 3710855 A2 | 9/2020 |
| EP | 3775979 A1 | 2/2021 |
| EP | 3830602 A1 | 6/2021 |
| EP | 3953727 A1 | 2/2022 |
| EP | 3977159 A1 | 4/2022 |
| EP | 3980808 A1 | 4/2022 |
| EP | 3990943 A1 | 5/2022 |
| EP | 4004587 A1 | 6/2022 |
| FR | 2816264 A1 | 5/2002 |
| JP | 5-243552 A | 9/1993 |
| JP | 7-253460 | 10/1995 |
| JP | 8-280173 A | 10/1996 |

(56) References Cited

FOREIGN PATENT DOCUMENTS

| | | |
|---|---|---|
| JP | 10-126007 A | 5/1998 |
| JP | 2000-147604 A | 5/2000 |
| JP | 2002-214361 A | 7/2002 |
| JP | 2003258359 A | 9/2003 |
| JP | 2003-536061 | 12/2003 |
| JP | 2004-078255 A | 3/2004 |
| JP | 2004-94115 | 3/2004 |
| JP | 2004-361315 A | 12/2004 |
| JP | 2005-331273 A | 12/2005 |
| JP | 2006-162386 A | 6/2006 |
| JP | 2007-214564 | 8/2007 |
| JP | 2008-015434 A | 1/2008 |
| JP | 4108478 B2 | 6/2008 |
| JP | 2008-180719 A | 8/2008 |
| JP | 2009-103529 | 5/2009 |
| JP | 2009-170870 A | 7/2009 |
| JP | 2009-204691 | 9/2009 |
| JP | 2010-91855 | 4/2010 |
| JP | 2010-256291 A | 11/2010 |
| JP | 2011-003748 A | 1/2011 |
| JP | 2012-504771 A | 2/2012 |
| JP | 5096008 B2 | 12/2012 |
| JP | 2013-050310 A | 3/2013 |
| JP | 2013-113669 A | 6/2013 |
| JP | 2014-059302 A | 4/2014 |
| JP | 2014-077658 A | 5/2014 |
| JP | 2016-146417 | 8/2016 |
| JP | 2016-176721 A | 10/2016 |
| JP | 2016-188808 A | 11/2016 |
| JP | 2016-540189 A | 12/2016 |
| JP | 2017-053833 A | 3/2017 |
| JP | 2017-134814 A | 8/2017 |
| JP | 2018-025632 A | 2/2018 |
| JP | 2019-060652 A | 4/2019 |
| JP | 2019-68528 A | 4/2019 |
| JP | 2019-509474 A | 4/2019 |
| JP | 2019-516101 A | 6/2019 |
| JP | 2020-510208 A | 4/2020 |
| JP | 2021-503085 A | 2/2021 |
| JP | 2021-507260 A | 2/2021 |
| JP | 6839861 B2 | 3/2021 |
| JP | 6865492 B2 | 4/2021 |
| JP | 2021-073462 A | 5/2021 |
| JP | 2021-073473 A | 5/2021 |
| JP | 2021-105613 A | 7/2021 |
| JP | 2021-519926 A | 8/2021 |
| JP | 2021-139918 A | 9/2021 |
| JP | 2021-532368 A | 11/2021 |
| JP | 2022-001885 A | 1/2022 |
| JP | 6995413 B2 | 1/2022 |
| JP | 2022-022361 A | 2/2022 |
| JP | 2022-036224 A | 3/2022 |
| JP | 7037830 B2 | 3/2022 |
| JP | 2022-526998 A | 5/2022 |
| JP | 2022-534500 A | 8/2022 |
| KR | 10-2000-0053620 A | 8/2000 |
| KR | 10-2009-0016499 A | 2/2009 |
| KR | 10-2012-0053045 A | 5/2012 |
| KR | 10-2012-0061033 A | 6/2012 |
| KR | 10-2013-0140554 A | 12/2013 |
| KR | 10-2014-0138724 A | 12/2014 |
| KR | 10-2015-0045735 A | 4/2015 |
| KR | 10-2016-0101140 A | 8/2016 |
| KR | 10-2018-0049937 A | 5/2018 |
| KR | 10-2018-0064969 A | 6/2018 |
| KR | 10-2018-0128447 A | 12/2018 |
| KR | 10-2019-0076725 A | 7/2019 |
| KR | 10-2019-0117418 A | 10/2019 |
| KR | 10-2019-0120403 A | 10/2019 |
| KR | 10-2020-0011351 A | 2/2020 |
| KR | 10-2020-0075014 A | 6/2020 |
| KR | 10-2020-0096632 A | 8/2020 |
| KR | 10-2020-0128435 A | 11/2020 |
| KR | 10-2021-0021409 A | 2/2021 |
| KR | 102218679 B1 | 2/2021 |
| KR | 10-2021-0029831 A | 3/2021 |
| KR | 10-2021-0065207 A | 6/2021 |
| KR | 10-2021-0137584 A | 11/2021 |
| KR | 10-2021-0137586 A | 11/2021 |
| KR | 102326493 B1 | 11/2021 |
| KR | 102326508 B1 | 11/2021 |
| KR | 10-2022-0003600 A | 1/2022 |
| KR | 10-2022-0017412 A | 2/2022 |
| KR | 102364531 B1 | 2/2022 |
| KR | 10-2022-0024177 A | 3/2022 |
| KR | 10-2022-0025924 A | 3/2022 |
| KR | 10-2022-0038691 A | 3/2022 |
| KR | 10-2398080 B1 | 5/2022 |
| WO | 99-42856 A1 | 8/1999 |
| WO | 2002/065153 A1 | 8/2002 |
| WO | 2006/044758 A2 | 4/2006 |
| WO | 2006/083349 A2 | 8/2006 |
| WO | 2013107709 A1 | 7/2013 |
| WO | 2014/014838 A2 | 1/2014 |
| WO | 2015/040671 A1 | 3/2015 |
| WO | 2015040671 | 3/2015 |
| WO | 2015/059705 A1 | 4/2015 |
| WO | 2017/112416 A1 | 6/2017 |
| WO | 2017/132704 A1 | 8/2017 |
| WO | 2017/184336 A2 | 10/2017 |
| WO | 2018028795 A1 | 2/2018 |
| WO | 2018082762 A1 | 5/2018 |
| WO | 2018/169758 A1 | 9/2018 |
| WO | 2018166609 A1 | 9/2018 |
| WO | 2018166610 A1 | 9/2018 |
| WO | 2018166611 A1 | 9/2018 |
| WO | 2018169758 | 9/2018 |
| WO | 2018/180391 A | 10/2018 |
| WO | 2018/181250 A1 | 10/2018 |
| WO | 2018/191495 A1 | 10/2018 |
| WO | 2019/010320 A1 | 1/2019 |
| WO | 2019/022941 A1 | 1/2019 |
| WO | 2019-064062 A1 | 4/2019 |
| WO | 2019115148 A1 | 6/2019 |
| WO | 2019/195054 A1 | 10/2019 |
| WO | 2019/221776 A2 | 11/2019 |
| WO | 2020/028173 A1 | 2/2020 |
| WO | 2020/210176 A1 | 10/2020 |
| WO | 2020/242834 A1 | 12/2020 |
| WO | 2020/251891 A1 | 12/2020 |
| WO | 2020/263735 A1 | 12/2020 |
| WO | 2021/021872 A1 | 2/2021 |
| WO | 2021/150860 A1 | 7/2021 |
| WO | 2021/236201 A2 | 11/2021 |
| WO | 2022/103778 A1 | 5/2022 |

OTHER PUBLICATIONS

Notification Concerning Transmittal of International Preliminary Report on Patentability (Chapter I of the Patent Cooperation Treaty) for International Application No. PCT/US18/041021, dated Feb. 6, 2020, 10 pages, The International Bureau of WIPO, Geneva, Switzerland.
"Supplementary European Search Report" for European Patent Application No. EP17786325, dated Mar. 11, 2020, 22 pages, European Patent Office, Munich, Germany.
"Office Action" for U.S. Appl. No. 15/456,789, dated Sep. 25, 2019, 58 pages, The USPTO.
"Notice of Allowance" for U.S. Appl. No. 16/028,774, dated Aug. 21, 2019, 56, pages, The USPTO.
Notice of Allowance received for U.S. Appl. No. 15/456,789 dated Apr. 29, 2020, 45 pages.
U.S. Appl. No. 15/915,840, filed Mar. 8, 2018 in the USPTO.
"Notice of Allowance" for Japanese Patent Application No. 2018-555665, dated Dec. 2, 2020, 05 pages, Japanese Patent Office, Japan (Including English Translation.
Notification of Reason for Refusal received for JP Patent Application No. 2021-014376, dated Sep. 27, 2021, 16 pages (Including English Translation).
Non-Final Office Action received for U.S. Appl. No. 15/915,840 dated May 7, 2020, 100 pages.

(56) References Cited

OTHER PUBLICATIONS

Notice of Allowance received for U.S. Appl. No. 15/915,840 dated Jan. 19, 2021, 40 pages.
"Extended Search Report" for European Patent Application No. 18767885.9, dated Nov. 18, 2020, 10 pages, European Patent Office, Munich, Germany.
"Japanese Office Action" for Japanese Patent Application No. 2019-549550, dated Mar. 22, 2021, 2 pages, Japanese Patent Office, Japan (Including English Translation).
"Notice of Preliminary Rejection" for South Korean Patent Application No. 10-2019-7029980, 4 pages, dated Mar. 26, 2021, Korean Intellectual Property Office, South Korea (Including English Translation).
Plant, et al., 256-Channel Bidirectional Optical Interconnect Using VCSELs and Photodiodes on CMOS, IEEE Journal of Lightwave Technology, Aug. 2001, pp. 1093-1103, vol. 19, No. 8.
Knodl, et al., Bipolar Cascade VCSEL with 130% Differential Quantum Efficiency, Annual Report 2000, Optoelectronics Department, University of ULM, pp. 11-14.
RA Morgan, et al., Two-Dimensional Matrix Addressed Vertical Cavity Top-Surface Emitting Laser Array Display, IEEE Photonics Technology Letters, Aug. 1994, pp. 913-917, vol. 6, No. 8.
M. Orenstein, et al., Matrix Addressable Vertical Cavity Surface Emitting Laser Array, Electronics Letters, Feb. 28, 1991, pp. 437-438, vol. 27, No. 5.
K.M. Geib, et al., Fabrication and Performance of Two-Dimensional Matrix Addressable Arrays of Integrated Vertical-Cavity Lasers and Resonant Cavity Photodetectors, IEEE Journal of Selected Topics in Quantum Electronics, Jul./Aug. 2002, pp. 943-947, vol. 8, No. 4.
Moench, et al., VCSEL Based Sensors for Distance and Velocity, Vertical Cavity Surface-Emitting Lasers XX, Edited by K. Choquette, J. Guenter, Proc of SPIE, 2016, 11 pages, vol. 9766, 07660A.
"Notice of Grant" for Korean Patent Application No. 10-2019-7029980, 2 pages, dated Aug. 6, 2021, The Korean Intellectual Property Office, South Korea (Including English Translation).
Final Office Action received for JP Patent Application No. 2019-549550, dated Aug. 27, 2021, 7 pages (Including English Translation).
Non-Final Rejection received for U.S. Appl. No. 16/686,163 dated Apr. 16, 2020, 99 pages.
Notice of Allowance received for U.S. Appl. No. 16/686,163 dated Oct. 16, 2020, 30 pages.
"Office Action" for Korean Patent Application No. 10-2020-7005082, dated May 8, 2020, 9 pages, Korean Intellectual Property Office, South Korea (Including English Translation).
"Notice of Reasons for Rejection" for Japanese Patent Application No. 2020-504014, dated Sep. 2, 2020, 2 pages, Japanese Patent Office, Japan (Including English Translation).
"Notice of Grant" for Korean Patent Application No. 10-2020-7005082, dated Nov. 24, 2020, 3 pages, The Korean Intellectual Property Office, South Korean (Including English Translation).
"First Office Action" for Chinese Patent Application No. 201880047615.6, dated Jan. 18, 2021, 8 pages, China National Intellectual Property Administration, Beijing, China (Including English Translation).
"Notice of Allowance" for Japanese Patent Application No. 2020-504014, dated Feb. 15, 2021, 3 pages, Japanese Patent Office (Including English Translation).
"Extended European Search Report" for European Patent Application No. 18839499.3, dated Mar. 4, 2021, 10 pages, European Patent Office, Munich, Germany.
"Notice of Preliminary Rejection" for South Korean Patent Application No. 10-2021-7004589, dated Mar. 10, 2021, 5 pages, Korean Intellectual Property Office, South Korea (Including English Translation).
"Office Action" for Japanese Patent Application No. 2021-056628, dated Jun. 14, 2021, 2 pages, Japanese Patent Office, Japan (Including English Translation).
"Notice of Grant" for Korean Patent Application No. 10-2021-7004589, 2 pages, dated Aug. 6, 2021, The Korean Intellectual Property Office, South Korea (Including English Translation).

Second Office Action received for Chinese Patent Application Serial No. 201880047615.6 dated Aug. 25, 2021, 14 pages (Including English Translation).
Decision to Grant a Patent received for Japanese Patent Application Serial No. 2021-056628 dated Nov. 2, 2021, 5 pages. (Including English Translation).
Non-Final Office Action received for U.S. Appl. No. 16/168,054 dated Jun. 1, 2021, 102 pages.
"Notification Concerning Transmittal of International Preliminary Report on Patentability (Chapter I of the Patent Cooperation Treaty)" for PCT/US2018/057026, dated May 28, 2020, 7 pages, The International Bureau of WIPO, Geneva, Switzerland.
Extended European Search Report received for European Patent Application No. 18918938.4, dated Jul. 6, 2021, 9 pages, European Patent Office, Munich, Germany.
"Notice of Preliminary Rejection" for Korean Patent Application 10-2020-7016928, dated Jul. 16, 2021, 6 pages, Korean Intellectual Property Office, Daejeon, South Korea (Including English Translation).
"Office Action" South Korean Patent Application No. 10-2021-7006391, dated May 14, 2021, 8 pages, Korean Intellectual Property Office, South Korea (Including English Translation).
International Preliminary Report on Patentability received for PCT Application Serial No. PCT/US2019/043674 dated Feb. 18, 2021, 10 pages.
"Notification of Transmittal of the International Search Report and The Written Opinion of the International Searching Authority, or the Declaration" for International Patent Application No. PCT/US2020/026964, dated Jul. 28, 2020, 10 pages, ISA/KR, Korean Intellectual Property Office, Daejeon, Republic of Korea.
International Preliminary Report on Patentability received for PCT Patent Application No. PCT/US2020/026964, dated Oct. 21, 2021, 7 pages.
Non-Final Office Action received for U.S. Appl. No. 17/227,300 dated Jun. 30, 2021, 82 pages.
"Notification of Transmittal of the International Search Report and the Written Opinion of the International Searching Authority, or the Declaration" for Internatonal Patent Application No. PCT/US2020/033630, dated Sep. 9, 2020, 10 pages, International Searching Authority, Korean Intellectual Property Office, Daejeon, Republic of Korea.
"Notification of Transmittal of the International Search Report and the Written Opinion of the International Searching Authority, or the Declaration" for PCT/US2020/036634, dated Sep. 21, 2020, 9 pages, ISA/KR, Korean Intellectual Property Office, Daejeong, Republic of Korea.
"Notification of Transmittal of the International Search Report and the Written Opinion of the International Searching Authority, or the Declaration" for International Application No. PCT/US2020/038927, 14 pages, ISA/KR, International Searching Authority, Daejeong, Republic of Korean.
"Notification of Transmittal of the International Search Report and the Written Opinion of the International Searching Authority, or the Declaration" for International Patent Application No. PCT/US2020/043979, dated Nov. 10, 2020, 9 pages, ISA/KR, Korean Intellectual Property Office, Daejeon, Republic of Korea.
"Notification of Transmittal of the International Search Report and the Written Opinion of the International Searching Authority, or the Declaration" for International Patent Application No. PCT/US2021/014564, dated May 17, 2021, 10 pages, ISA/KR, Korean Intellectual Property Office, Daejeon, Republic of Korea.
Communication pursuant to Article 94(3) EPC received for EP Patent Application Serial No. 17786325.5 dated Dec. 17, 2021, 5 pages.
Notification of Reason for Refusal received for Korean Patent Application Serial No. 10-2021-7036648 dated Dec. 17, 2021, 8 pages (Including English Translation).
Decision to Grant a Patent received for Korean Patent Application Serial No. 10-2020-7016928 dated Nov. 16, 2021, 3 pages (Including English Translation).
Final Office Action received for U.S. Appl. No. 16/168,054 dated Jan. 26, 2022, 46 pages.

(56) References Cited

OTHER PUBLICATIONS

Notice of Final Rejection received for Korean Patent Application Serial No. 10-2021-7006391 dated Oct. 22, 2021, 5 pages (Including English Translation).
International Preliminary Report on Patentability received for PCT Application Serial No. PCT/US2020/033630 dated Dec. 9, 2021, 8 pages.
"Notification of Transmittal of the International Search Report and The Written Opinion of the International Searching Authority, or the Declaration" for International Patent Application No. PCT/US2018/021553, dated Jun. 20, 2018, 13 pages, International Searching Authority, Korean Intellectual Property Office, Daejeon, Republic of Korea.
Extended European Search Report received for European Patent Application Serial No. 19781037.7 dated Oct. 25, 2021, 9 pages.
International Preliminary Report on Patentability received for PCT Application Serial No. PCT/US2020/036634 dated Dec. 23, 2021, 6 pages.
International Search Report and Written Opinion received for PCT Application Serial No. PCT/US2021/058687 dated Mar. 3, 2022, 11 pages.
Notice of Preliminary Rejection received for Korean Patent Application Serial No. 10-2018-7030512 dated Dec. 23, 2021, 6 pages. (Including English Translation).
Decision to Grant a Patent received for Japanese Patent Application Serial No. 2021-14376 dated Mar. 22, 2022, 05 pages. (Including English Translation).
Non-Final Office Action received for U.S. Appl. No. 17/164,773 dated Apr. 21, 2022, 87 pages.
Decision to Grant a Patent received for Chinese Patent Application Serial No. 201880047615.6 dated Mar. 23, 2022, 3 pages. (Including English Translation).
Decision to Grant a Patent received for Korean Patent Application Serial No. 10-2018-7030512 dated Mar. 18, 2022, 4 pages (Including English Translation).
Decision to Grant a Patent received for Korean Patent Application Serial No. 10-2021-7036648 dated May 19, 2022, 4 pages (Including English Translation).
Decision to Grant a Patent received for Japanese Patent Application Serial No. 2019-549550 dated Feb. 25, 2022, 5 pages (Including English Translation).
"Office Action" for Japanese Patent Application No. 2021-0020502, dated Apr. 13, 2022, 10 pages, Japanese Patent Office, Japan (Including English Translation).
Notice of Allowance received for U.S. Appl. No. 17/227,300 dated Aug. 2, 2022, 39 pages.
International Search Report and Written Opinion received for PCT Application Serial No. PCT/US2021/020749 dated Jan. 3, 2022, 9 pages.
International Preliminary Report on Patentability received for PCT Application Serial No. PCT/US2020/038927 dated Jan. 6, 2022, 9 pages.
Notification of Reason for Refusal received for Korean Application Serial No. 10-2020-7029872 dated Jan. 19, 2022, 30 pages (Including English Translation).
Extended European Search Report received for European Patent Application Serial No. 19843301.3 dated Feb. 18, 2022, 10 pages.
International Preliminary Report on Patentability received for PCT Application Serial No. PCT/US2020/043979 dated Feb. 1, 2022, 05 pages.
Notice of Final Rejection received for Korean Application Serial No. 10-2020-7029872 dated May 24, 2022, 05 pages (Including English Translation).
Decision to Grant a Patent received for Korean Patent Application Serial No. 10-2021-7006391 dated Feb. 9, 2022, 04 pages (Including English Translation).
"European Search Report" for European Patent Application No. 17786325.5, dated Nov. 9, 2019, 18 pages, European Patent Office, Munich, Germany.

"Notification of Transmittal of The International Search Report and The Written Opinion of The International Searching Authority, or The Declaration" for International Patent Application No. PCT/US2018/041021, dated Nov. 5, 2018, 15 Pages, Korean Intellectual Property Office, Daejeon, Republic of Korea.
"Notification Concerning Transmittal of International Preliminary Report on Patentability (Chapter I of the Patent Cooperation Treaty)" for International Patent Application No. PCT/US2018/021553, dated Sep. 26, 2019, 9 pages, The International Bureau of WIPO, Geneva, Switzerland.
"Notice of Preliminary Rejection" for Korean Patent Application No. 10-2020-7029872, dated Jul. 19, 2021, 10 pages, Korean Intellectual Property Office.
"Notification of Transmittal of The International Search Report and The Written Opinion of the International Searching Authority, or The Declaration" for International Patent Application No. PCT/US2018/057026, dated Dec. 16, 2019, 11 pages, International Searching Authority, Korean Intellectual Property Office, Daejeon, Republic of Korea.
"Notification of Transmittal of the International Search Report and the Written Opinion of the International Searching Authority, or the Declaration" for International Patent Application No. PCT/US2019/043674, dated Nov. 15, 2019, 16 pages, International Searching Authority/KR, Daejeon, Republic of Korea.
"Notification Concerning Transmittal of International Preliminary Report on Patentability (Chapter 1 of The Patent Cooperation Treaty)" for International Patent Application No. PCT/US2017/026109, dated Nov. 1, 2018, 13 Pages, The International Bureau of WIPO, Geneva, Switzerland.
Notification of Transmittal of the International Search Report and The Written Opinion of the International Searching Authority, or the Declaration, for International Application No. PCT/US2017/026109, dated Jun. 19, 2017, 17 pages, International Search Authority/Korean Intellectual Property Office, Daejeon, Republic of Korea.
U.S. Appl. No. 15/456,789, filed Mar. 13, 2017 in the USPTO.
U.S. Appl. No. 16/028,774, filed Jul. 6, 2018 in the USPTO.
Notification of Transmittal of the International Search Report and the Written Opinion of the International Searching Authority, or the Declaration for International Patent Application No. PCT/US2019/024343, dated Jul. 12, 2019, 17 Pages, ISA/KR, Korean Intellectual Property Office, Daejeon, Republic of Korea.
"Written Opinion of the International Searching Authority" for International Patent Application No. PCT/EP2016/077499, dated Feb. 14, 2017, 7 pages, The International Searching Authority.
"Search Report" for International Patent Application No. PCT/EP2016/077499, 2 pages, International Searching Authority/ EPO, Rijswijk, the Netherlands.
Office Action received for Japanese Patent Application Serial No. 2021-100687, dated Jul. 1, 2022, 09 pages. (6 pages of English Translation and 3 pages of Official Copy).
Restriction Requirement received for U.S. Appl. No. 16/523,459, dated Jun. 16, 2022, 05 pages.
Notice of Allowance received for U.S. Appl. No. 16/841,930, dated Jun. 29, 2022, 10 pages.
Non-Final Office Action received for U.S. Appl. No. 16/878,140, dated Jun. 22, 2022, 24 pages.
Non-Final Office Action received for U.S. Appl. No. 16/907,732, dated Jul. 13, 2022, 20 pages.
International Preliminary Report on Patentability received for PCT Application Serial No. PCT/US2021/014564, dated Aug. 4, 2022, 06 pages.
Notice of Allowance received for U.S. Appl. No. 16/895,588, dated Aug. 3, 2022, 9 pages.
Non-Final Office Action received for U.S. Appl. No. 16/523,459, dated Sep. 13, 2022, 11 pages.
International Search Report and Written Opinion received for PCT Patent Application No. PCT/US2018/057026, dated Dec. 16, 2019, 9 pages.
Office Action received for Japanese Patent Application Serial No. 2021-168642, dated Aug. 25, 2022, 4 pages (2 pages of English Trasnlation and 2 pages of Official Copy).

(56) References Cited

OTHER PUBLICATIONS

Office Action received for Japanese Patent Application Serial No. 2020-526502, dated Aug. 24, 2022, 10 pages (5 pages of English Translation and 5 pages of Official Copy).
Notice of Allowance received for U.S. Appl. No. 16/805,733, dated Aug. 22, 2022, 13 pages.
Office Action received for Japanese Patent Application No. 2021-168642, dated Mar. 15, 2023, 5 pages (Previously cited Office Action, now resubmitting along with English Translation; 3 pages of English Translation and 2 pages of Official Copy).
Office Action received for Chinese Patent Application Serial No. 201780024892.0, dated Sep. 2, 2022, 28 pages (11 pages of English Translation and 17 pages of Official Copy).
Extended European Search Report received in European Application No. 20787345.6, dated Dec. 5, 2022, 3 pages.
Final Office Action received for U.S. Appl. No. 16/878,140, dated Feb. 1, 2023, 26 pages.
Notice of Allowance received for U.S. Appl. No. 17/164,773, dated Feb. 1, 2023, 8 pages.
Notice of Allowance received for U.S. Appl. No. 16/841,930, dated Jan. 30, 2023, 9 pages.
Restriction Requirement received for U.S. Appl. No. 16/941,896, dated Jan. 24, 2023, 06 pages.
Partial European Search Report received for European Patent Application No. 22178999.3, dated Oct. 10, 2022, 22 pages.
Decision to Grant received for Korean Patent Application Serial No. 10-2022-7021139, dated Dec. 14, 2022, 3 pages (1 page of English Translation and 2 pages of Official Copy).
Office Action received for Japanese Patent Application No. 2021-020502, dated Jan. 23, 2023, 6 pages (4 pages of English Translation and 2 pages of Official Copy).
Office Action received for Korean Patent Application No. 10-2021-7016081, dated Oct. 25, 2022, 4 pages (2 pages of English Translation and 2 pages of Official Copy).
Office Action received for Japanese Patent Application Serial No. 2021-199077, dated Dec. 23, 2022, 9 pages (6 pages of English Translation and 3 pages of Official Copy).
Office Action received for Korean Patent Application No. 10-2022-7028820, dated Dec. 15, 2022, 12 pages (6 pages of English Translation and 6 pages of Official Copy).
Extended European Search Report received for European Patent Application No. 20815113.4, dated Jan. 31, 2023, 14 pages.
Partial European Search Report received for European Patent Application No. 20822328.9, dated Feb. 6, 2023, 20 pages.
Office Action received for Korean Patent Application No. 10-2022-7004969, dated Jan. 9, 2023, 11 pages (6 pages of English Translation and 5 pages of Official Copy).
Office Action received for Japanese Patent Application Serial No. 2020-552870, dated Nov. 29, 2022, 11 pages (7 pages of English Translation and 4 pages of Official Copy).
Office Action received for Japanese Patent Application Serial No. 2022-002790, dated Dec. 26, 2022, 10 pages (7 pages of English Translation and 3 pages of Official Copy).
Decision to Grant received for Korean Patent Application Serial No. 10-2020-7029872, dated Nov. 28, 2022, 3 pages (1 page of English Translation and 2 pages of Official Copy).
Office Action received for Korean Patent Application No. 10-2022-7015754, dated Dec. 12, 2022, 21 pages (11 pages of English Translation and 10 pages of Official Copy).
Non-Final Office Action received for U.S. Appl. No. 17/227,295, dated Mar. 9, 2023, 10 pages.
International Preliminary Report on Patentability received for PCT Application Serial No. PCT/US2021/020749, dated Sep. 15, 2022, 8 pages.
Extended European Search Report received for European Patent Application No. 22178999.3, dated Mar. 6, 2023, 25 pages.
International Search Report and the Written Opinion received for PCT Patent Application No. PCT/US2022/019054, dated Feb. 20, 2023, 13 pages.
Office Action received for Korean Application Serial No. 10-2021-7036300, dated Feb. 9, 2023, 14 pages (7 pages of English Translation and 7 pages of Official Copy).
Decision to Grant received for Korean Patent Application Serial No. 10-2021-7040665, dated Feb. 23, 2023, 3 pages (1 page of English Translation and 2 pages of Official Copy).
Office Action received for Chinese Patent Application Serial No. 201880017776.0, dated Feb. 16, 2023, 22 pages (10 pages of English Translation and 12 pages of Official Copy).
Office Action received for Chinese Patent Application Serial No. 201880074279.4, dated Mar. 1, 2023, 23 pages (9 pages of English Translation and 14 pages of Official Copy).
Notice of Allowance received for U.S. Appl. No. 16/805,733, dated Nov. 10, 2022, 5 pages.
Notice of Allowance received for U.S. Appl. No. 16/841,930, dated Oct. 3, 2022, 8 pages.
Non-Final Office Action received for U.S. Appl. No. 16/168,054, dated Oct. 20, 2022, 16 pages.
Notice of Allowance received for U.S. Appl. No. 17/164,773, dated Nov. 2, 2022, 8 pages.
Notice of Allowance received for U.S. Appl. No. 16/805,733, dated Jan. 25, 2023, 5 pages.
Office Action received for Korean Patent Application No. 10-2022-7036873, dated Mar. 29, 2023, 22 pages (12 pages of English Translation and 10 pages of Official Copy).
Extended European Search Report received for European Patent Application No. 20822328.9, dated May 4, 2023, 34 pages.
Notice of Allowance received for U.S. Appl. No. 16/805,733, dated May 8, 2023, 5 pages.
Non-Final Office Action received for U.S. Appl. No. 17/155,626, dated Apr. 12, 2023, 24 pages.
Notice of Allowance received for U.S. Appl. No. 16/841,930, dated Apr. 17, 2023, 9 pages.
Final Office Action received for U.S. Appl. No. 16/523,459, dated Apr. 14, 2023, 13 pages.
International Search Report and the Written Opinion received for PCT Patent Application No. PCT/US2022/028297, dated Mar. 13, 2023, 11 pages.
Office Action received for Japanese Patent Application Serial No. 2021-100687, dated Mar. 14, 2023, 05 pages. (3 pages of English Translation and 2 pages of Official Copy).
Office Action received for Japanese Patent Application No. 2020-526502, dated Mar. 14, 2023, 8 pages (5 pages of English Translation and 3 pages of Official Copy).
Office Action received for Japanese Patent Application No. 2022-80688, dated Mar. 17, 2023, 11 pages (7 pages of English Translation and 4 pages of Official Copy).
Office Action received for Japanese Patent Application No. 2021-168642, dated Mar. 15, 2023, 2 pages (Official Copy Only).
Notice of Allowance received for U.S. Appl. No. 17/164,773, dated Apr. 5, 2023, 8 pages.
Office Action received for Korean Patent Application No. 10-2023-7007292, dated Apr. 17, 2023, 19 pages (10 pages of English Translation and 9 pages of Official Copy).
Decision to Grant a Patent received for Korean Patent Application Serial No. 10-2023-7009114, dated May 16, 2023, 3 pages (1 page of English Translation and 2 pages of Official Copy).
Office Action for Japanese Patent Application No. 2021-572877, dated May 12, 2023, 12 pages (8 pages of English Translation and 4 pages of Official Copy).
Office Action received for Japanese Patent Application No. 2021-559434, dated May 26, 2023, 17 pages (11 pages of English Translation and 6 pages of Official Copy).
Extended European Search Report received for European Patent Application No. 20831915.2, dated Jun. 2, 2023, 9 pages.
International Preliminary Report on Patentability received for PCT Application Serial No. PCT/US2021/058687, dated May 25, 2023, 7 pages.
Notice of Allowance received for Japanese Patent Application Serial No. 2020-552870, dated Jul. 21, 2023, 3 pages (Official Copy Only).
Notice of Allowance received for Japanese Patent Application Serial No. 2022-002790, dated Jul. 28, 2023, 3 pages (Official Copy Only).

(56) References Cited

OTHER PUBLICATIONS

Office Action received for Chinese Patent Application Serial No. 201980023446.7, dated Sep. 1, 2023, 23 pages (10 pages of English Translation and 13 pages of Official Copy).

* cited by examiner

1000

| PARAMETER | VALUE |
|---|---|
| # OF LASERS | 1 |
| HORIZONTAL FOV | 40° |
| VERTICAL FOV | 25° |
| MAXIMUM MEASUREMENT RANGE | 150m |
| SYSTEM REFRESH RATE | 30 Hz |
| HORIZONTAL ANGULAR RESOLUTION | 0.2° |
| VERTICAL ANGULAR RESOLUTION | 0.2° |

FIG. 10

NOISE ADAPTIVE SOLID-STATE LIDAR SYSTEM

RELATED APPLICATION SECTION

The present application is a non-provisional of copending U.S. Provisional Patent Application Ser. No. 62/651,209, filed Apr. 1, 2018, and entitled "Noise Adaptive Solid-State LIDAR System". The entire contents of U.S. Patent Application Ser. No. 62/651,209 are incorporated herein by reference.

INTRODUCTION

Autonomous, self-driving, and semi-autonomous automobiles use a combination of different sensors and technologies such as radar, image-recognition cameras, and sonar for detection and location of surrounding objects. These sensors enable a host of improvements in driver safety including collision warning, automatic-emergency braking, lane-departure warning, lane-keeping assistance, adaptive cruise control, and piloted driving. Among these sensor technologies, light detection and ranging (LIDAR) systems take a critical role, enabling real-time, high resolution 3D mapping of the surrounding environment. To address the requirements of the increasingly complex array of automotive applications, LIDAR systems are required to have fast enough response time to respond to fast moving objects. LIDAR systems also must have sufficient signal-to-noise for the received signal to detect objects at distance. Furthermore, it is desirable for LIDAR systems to have high reliability, with a minimum of moving parts.

In addition, LIDAR systems can encounter a wide range of conditions and a varied set of requirements for resolution and speed during typical operations. As such, LIDAR systems are needed with operating parameters and capabilities that adapt to changing requirements and environments.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 10 illustrates a table of operating parameters for a known Micro-Electro-Mechanical System (MEMS) based scanning LIDAR system.

DESCRIPTION OF VARIOUS EMBODIMENTS

Figure 1A:
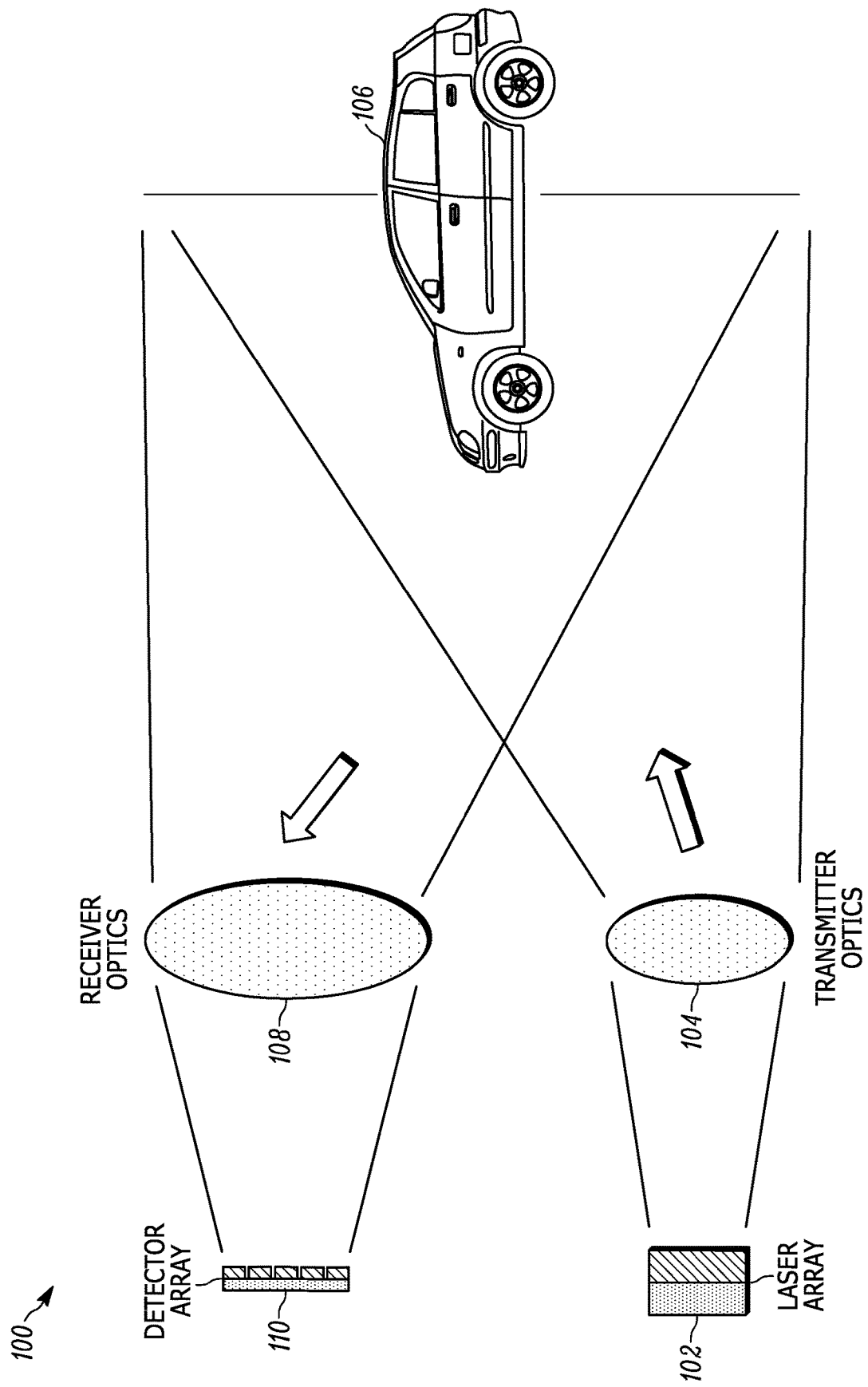
FIG. 1A illustrates a schematic diagram of a known solid-state LIDAR system.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teaching can be performed in any order and/or simultaneously as long as the teaching remains operable. Furthermore, it should be understood that the apparatus and methods of the present teaching can include any number or all of the described embodiments as long as the teaching remains operable.

The present teaching relates to solid-state LIDAR systems that measure distances to various objects or targets that reflect and/or scatter light. In particular, the present teaching describes a noise-adaptive solid-state LIDAR system that enables reduction of the noise in the received measurement signal, enabling improved SNR and thus longer measurement ranges.

Automotive applications require LIDAR systems with a measurement range exceeding 100 meters in order to provide sufficient time for responding to fast moving objects. For example, two vehicles in opposite lanes on a non-divided highway might have an oncoming relative velocity of 250 km/h (150 mph) or more. At 250 km/h, it will only take 1.44 seconds to close a 100-m gap between the two vehicles.

The signal-to-noise ratio (SNR) of the received signal determines whether an object can be detected at a particular distance with a particular error rate. Signal strength depends on the optical power transmitted. Higher transmit powers provide a stronger reflected return signal increasing the range. However, automotive LIDAR systems are typically constrained by Class 1 eye safety standards, which limit the maximum allowable optical power that can be transmitted. By operating within Class 1 eye-safe standards, a product that emits laser light is considered eye-safe under all reasonably anticipated conditions of use. Once the Class 1 eye safety transmit optical power limit is reached, further improvements in the SNR are best achieved through the optical receiver design and/or signal processing improvements. It is highly desired for LIDAR systems used in automotive application to be completely solid-state with no moving parts in order to maximize the reliability. It is also highly desired for the LIDAR system to be able to adapt to changing measurement requirements and conditions.

FIG. 1A illustrates a schematic diagram of a known solid-state LIDAR system. The system illustrated in FIG. 1A does not employ a flash transmitter which illuminates the full system field-of-view all at once. Instead, each individual laser in the transmitter array 102 can be fired independently, with the optical beam emitted by each laser corresponding to a 3D projection angle subtending only a portion of the total system field-of-view. One example of such a transmitter is described in detail in U.S. Patent Publication No. 2017/0307736 A1, which is assigned to the present assignee. The entire contents of U.S. Patent Publication No. 2017/0307736 A1 are incorporated herein by reference. In some embodiments, the array of transmitters is a regular-spaced array. In other embodiments, the array of transmitters is an irregular-shaped array. In various embodiments, the array of transmitters can be configured in a variety of shapes and sizes.

The optical beams from the lasers in the laser array 102 share the transmitter optics 104 and the reflected light from the target 106 shares the receiver optics 108. The detector array 110 is solid-state with no moving parts. The detector array 110 typically has a fewer number of individual detector elements than the transmitter array 102 has individual lasers. The measurement resolution of the LIDAR system 100 is not determined by the size of the detector elements in the detector array 110, but instead by the number of lasers in the transmitter array 102 and the collimation of the individual optical beams. A processor in the LIDAR system 100 performs a time-of-flight (TOF) measurement that determines a distance to a target 106 that reflects the optical beams from the lasers in the laser array 102 as detected at the detector array 110.

As understood by those skilled in the art, the evolution of the light from within and through the various optical elements in the LIDAR system can be described as projected at a particular reference plane in the optical system. Without loss of generality, and for purposes of this disclosure, this reference plane is taken to be the plane of the detector array 110. The projection through the LIDAR system of the light emitted from the laser array 102 at the reference plane is referred herein as the illumination region. The detector array 110 is positioned within the reference plane to detect the light in the illumination region. Also for simplicity, the operation of the system is described in relation to a particular target range, which is the position at which an object or target may be located. As is well known, LIDAR systems may operate in three dimensions, meaning that measurement points are taken across a 2D plane at multiple target ranges. These measurements at various target ranges result in what is commonly referred to as a 3D measurement point cloud. The extension to 3D operation based on description at a particular target range is well understood by those skilled in the art.

When energized, the lasers in the transmit array 102 generate light in a pattern within the illumination region at this plane of the detector array 110. The particular pattern is based on the specific elements in the laser array 102 that are energized so they produce light as described herein. This pattern at the illumination region assumes a uniform reflection across a 2D plane at the target range. As understood by those skilled in the art, a reference herein to a particular pattern of laser illumination in the illumination region is the pattern that is generated by this uniform reflection at target range. During operation, only a portion (or even none in some configurations) of the optical illumination from the laser array 102 will be reflected back to the illumination region. The optical illumination from the laser array 102 that falls on the detector array 110 in operation depends on a shape and position of an object or target 106 at the target range.

Figure 1B:
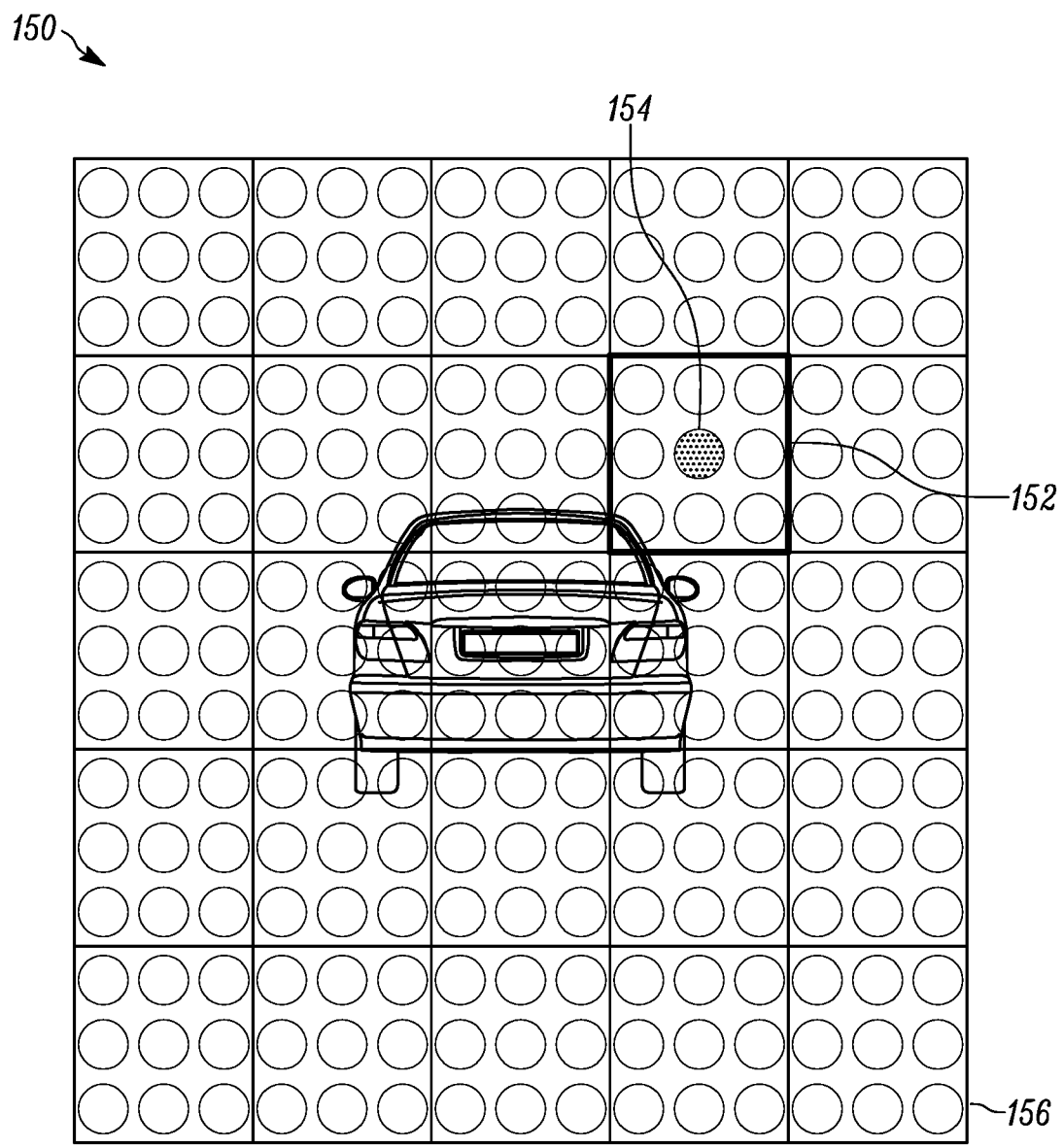
FIG. 1B illustrates a two-dimensional projection of the system Field-of-View (FOV) of the LIDAR system of FIG. 1A.

FIG. 1B illustrates a two-dimensional projection of the system field-of-view 150 of the LIDAR system of FIG. 1A. The system field-of-view 150 illustrates the illumination region referred to herein. A field-of-view of an individual detector in the detector array is represented by a small square 152. An illuminated measurement point associated with an individual laser in the transmitter is illustrated by a circle 154. The individual detector size within the array is largely determined by the electrical characteristics of the device. For example, as the size of the active area of an avalanche photodiode (APD) detector increases, the capacitance of the detector increases, reducing the optical-electrical bandwidth of the device. The bandwidth of the APD must be maintained high enough to not attenuate or distort the received signal. Typical values for the Optical-to-Electrical (O/E) bandwidth and APD capacitance in a LIDAR system with laser pulse widths<10 nsec, are 350 MHz, and less than 2 pF, respectively. In general, to cover the full field-of-view of the LIDAR system, while maintaining acceptable electrical detector performance, an array of detectors must be used. The overall physical size, and dimension of the array is determined by the required field-of-view and the optical lens system of the receiver.

In the embodiment of the LIDAR system 100 illustrated in FIGS. 1A-B, the ratio of the number of detectors in the detector array 110 to the number of lasers in the transmitter array 102 is one-to-nine. This can also be seen by the two-dimensional projection of the system field-of-view 150. In this embodiment, the detector array 110 is a 5×5 array. Compared to a flash system with equivalent angular resolution, the detector array cost of the LIDAR system 100 can be lower because the number of detectors can be lower. The measurement resolution of the LIDAR system 100 is not determined by the size of the detector elements, but instead is determined by the number of lasers in the transmitter array 102 and the collimation of the individual laser beams.

FIGS. 1A-B illustrate a critical aspect of the LIDAR system 100. A single 3D measurement point, the small circle 154 in the overall field-of-view 150 of the LIDAR system 100, is highlighted with that measurement point 154 shown as a dark circle. This measurement point circle 154 has a one-to-one correspondence with a specific individual laser in the laser transmitter array 102. It can be further seen that the measurement point 154 falls within an individual detector, where the field-of-view represented by small square 152 of that individual detector has been shown as a square with a bold outline. For example, the field-of-view of the entire detector array, represented by the large square 156 that includes all twenty-five small squares 152 of the array, can be reached in its entirety by utilizing the individual laser field-of-views, shown in FIG. 1B by small circle 154, from an array of 15×15 lasers whose field-of-view is represented by the 15×15 array of small circles 154. This field-of-view represented by large square 156 can be referred to as the input field-of-view of the optical receiver. It includes any transformation of the various receive optical elements in the path from the target range.

The 3D resolution of the LIDAR system 100 is determined by the number of lasers in the transmitter array 102. Each laser generates an optical beam that corresponds to a specific angular point in space as shown by measurement point circle 154. In the embodiment shown in FIG. 1B, when the single laser associated with measurement point circle 154 (shaded) is illuminated, the pattern in the illumination region is in the shape of circle 154. The field-of-view of the detector that is illuminated by the excited laser is the shape of square 152.

In such a solid-state LIDAR system 100, each element of the detector array 110 does not require its own separate receive electrical circuit, the detectors instead can be linked to a common receive circuit, since only one detector is needed to measure any given laser transmit pulse at any point in time. This provides a substantial benefit in reduced circuit complexity and cost. However, when all the detectors are linked onto the same circuit, the noise from all the detectors combines, and the increased noise will reduce the sensitivity of the system, reducing the measurement range.

Figure 2:
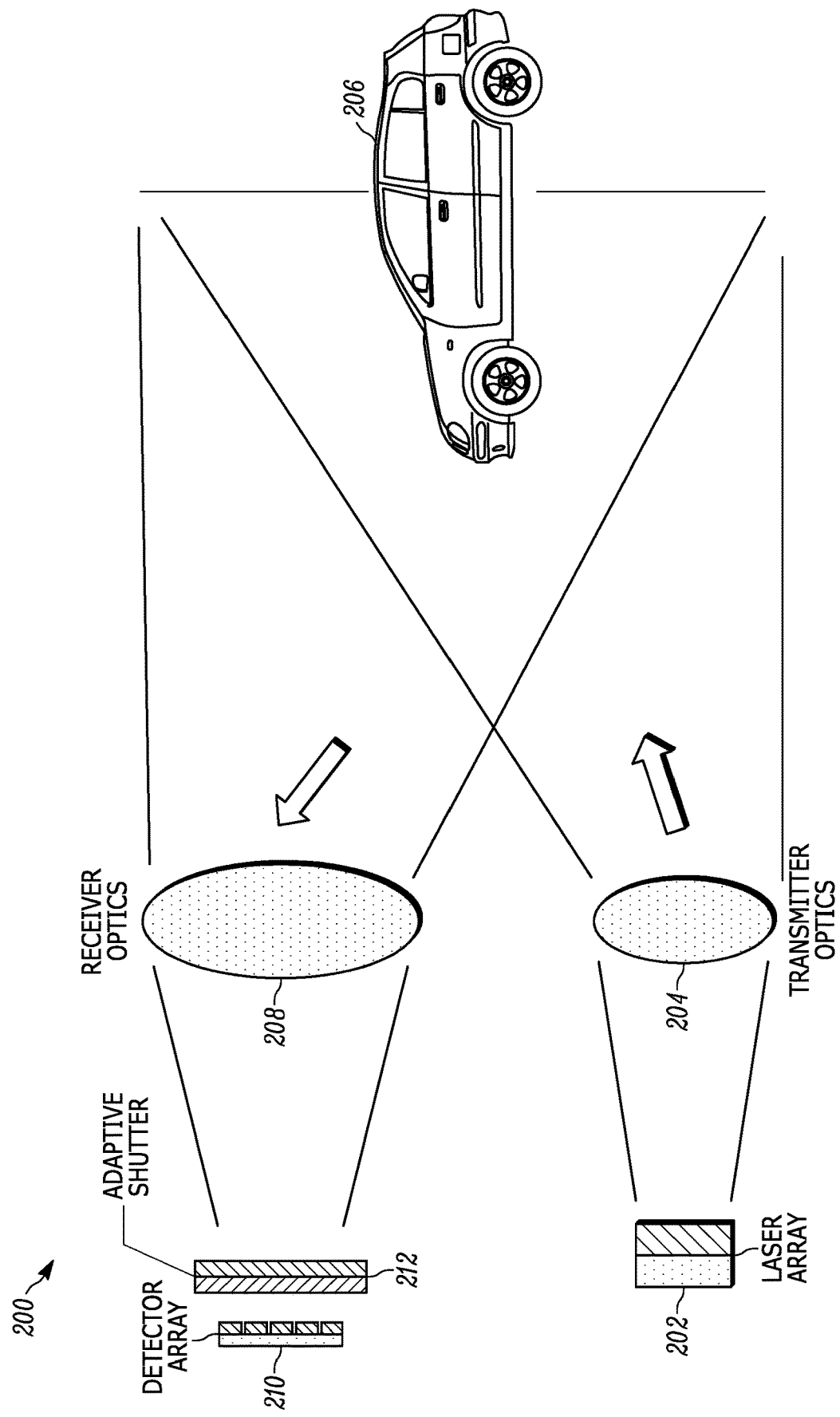
FIG. 2 illustrates a schematic diagram of an embodiment of an adaptive FOV LIDAR system according to the present teaching.

FIG. 2 illustrates a schematic diagram of an embodiment of an adaptive field-of-view LIDAR system 200 according to the present teaching. The embodiment shown in FIG. 2 includes a transmitter array 202, transmit optics 204, target 206, receive optics 208, and detector array 210 that are similar to those described in connection with the LIDAR system 100 of FIG. 1A. However, the embodiment shown in FIG. 2 includes an adaptive optical shutter 212 placed in front of the detector array 210. The adaptive optical shutter 212 improves the system performance, as compared to the LIDAR system 100 of FIG. 1A, by reducing the ambient light reaching the detector array 210. In a LIDAR system 200 that operates outdoors, the ambient light from the sun falling on the receiver generates an optical signal that can be large enough to suppress or obscure the detection of the received laser pulse. The adaptive shutter 212 can be used to block at least some of the ambient light from reaching the detector or detectors that are detecting measurement light from the optical beams emitted by the transmit array 202.

In some embodiments, the transmitter array 202 comprises a plurality of lasers where each laser, when activated, generates an optical beam that illuminates a field-of-view in the illumination region. A transmitter controller (not shown) is connected to the transmitter. The controller is described in more detail in connection with FIG. 7A. In many embodiments, the controller is able to control each of the plurality of lasers individually. The transmit controller can thus pulse desired ones of the plurality of lasers in a particular pattern so that the plurality of lasers generates light in the illumination region with a corresponding particular pattern that is based on the particular lasers that are activated. In addition, detector array 210 in the optical receiver includes a plurality of detectors positioned to detect light over the illumination region. The each of the plurality of detectors generates an electrical detection signal in response to detected light that falls within its respective field-of-view in the illumination region. The detected light is passed to a processor and other circuitry including a time-of-flight measurement circuit that measures the time-of-flight of light from the plurality of lasers to the plurality of detectors.

The processor and other circuitry in a receive controller calculate range information from the time-of-flight measurements to an object or objects that have reflected the light that is generated by the particular plurality of lasers in the transmit array 202 that are selected by the controller. In this way, different sizes and shapes of the field-of-view and illumination region are generated based on the performance requirements of the system. For example, particular measurement resolution and/or signal-to-noise ratios can be provided by changing a size or a shape of the field-of-view of the system. In various embodiments, various numbers of detectors in the detector array 210 and various numbers of lasers in the transmit array 202 are used. Also, various ratios of numbers of detectors in the detector array 210 to numbers of lasers in the transmit array 202 are used.

One feature of the present teaching is that the individual lasers, or groups of individual lasers within the transmitter array 202, can operate with different wavelengths. Multi-source and multi-wavelength LIDAR system have been proposed by the assignee of the present application. One example of a system that uses multiple wavelength transmitters is described in U.S. Patent Publication No. 2017/0307736 A1, which is assigned to the present assignee. The entire contents of U.S. Patent Publication No. 2017/0307736 A1 are incorporated herein by reference. Using multiple wavelengths in the transmitter results in various illumination patterns with different wavelengths that are generated simultaneously or separately for various purposes. For example, producing optical beams that result in desired illumination patterns at the target and/or detector (i.e. the illumination region) with different wavelengths can be used to achieve various performance metrics, such as generating higher resolution measurements that reduce processing requirements and that increase refresh rates or frame rates.

Figure 3:
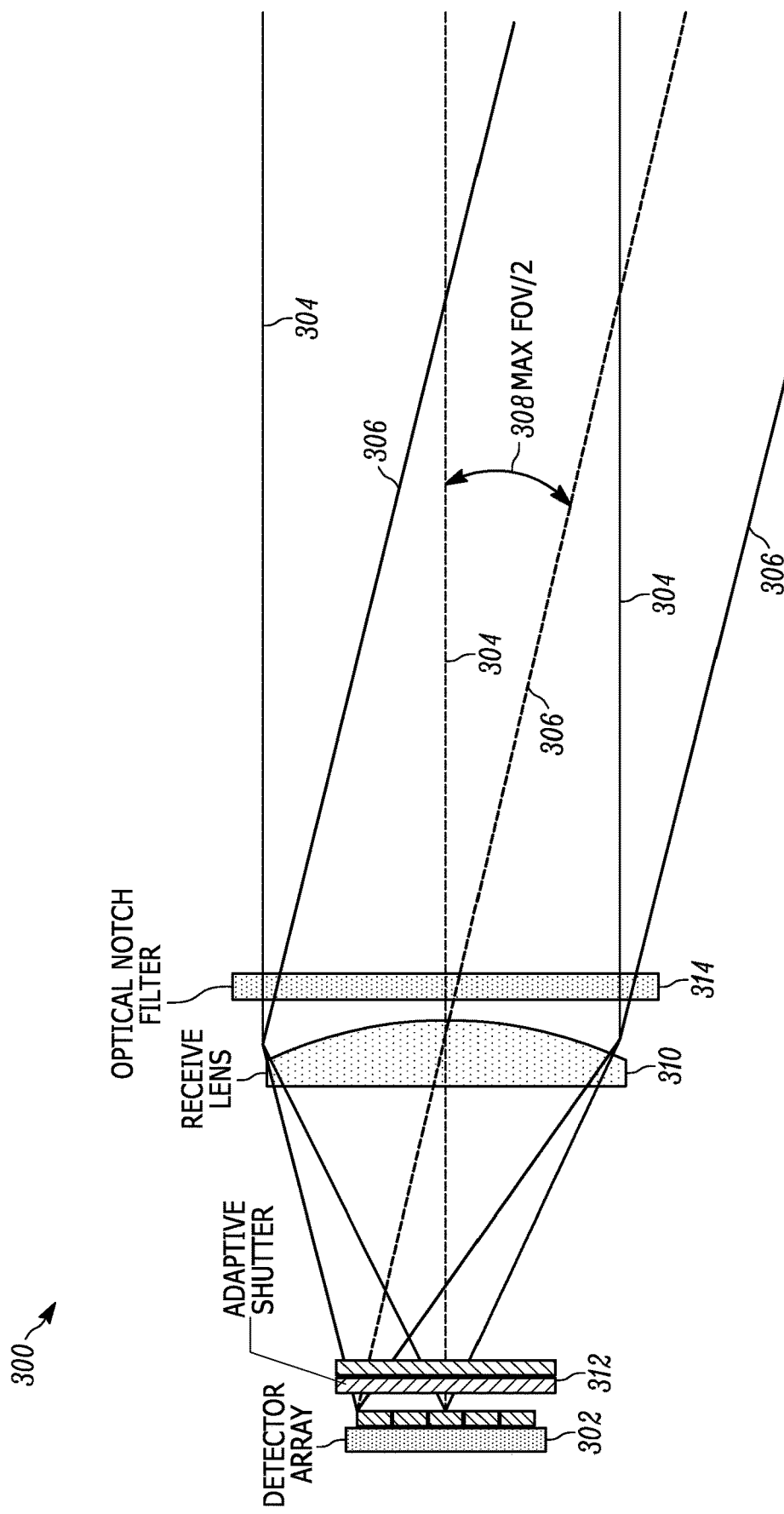
FIG. 3 illustrates a schematic diagram of the optical receiver of an embodiment of an adaptive LIDAR system according to the present teaching.

FIG. 3 illustrates a schematic diagram of the optical receiver 300 of an embodiment of an adaptive LIDAR system of the present teaching. For simplicity, a 2D diagram is shown here, but the principles apply equally to a full 3D system. The detector array 302 is placed nominally at the image plane of the optical system in the optical receiver. In some embodiments, the detector array 302 is not wavelength sensitive. In other embodiments, the detector array 302 is wavelength selective. The receive optical system is represented by receive lens 310, but may include multiple lenses and/or other optical elements. The size of the detector array 302 combined with the focal length of the optical system determines the maximum field-of-view of the optical receiver 300.

The schematic diagram shows ray traces 304 for the received beam that image to the center of the detector array 302 as well as ray traces 306 for the received beam that image to the topmost point of the detector array 302. Different points in the receiver field-of-view image to different detectors in the detector array dependent on their angular position. The angle 308 between ray traces 304 for the center of the detector array 302 and ray traces 306 for the topmost point of the detector array 302 represent half of the maximum field-of-view for the optical receive system.

The received optical beams reflected from the target pass through one or more receive lens 310 and an adaptive shutter 312 before striking the detector array 302. An optical notch filter 314 is positioned in front of the receiver lens 310. This optical notch filter 314 is used to reduce the solar radiation on the detector array 302. On a sunny day, at sea level, the maximum solar radiation is about 1 kW/m$^2$. Typically, the optical notch filter 314 is designed to reduce this radiation as much as possible and limit the optical receive bandwidth to a wavelength region corresponding to the expected wavelength range of the transmitter laser. For a LIDAR system operating~900 nm wavelength, a 20 nm bandwidth optical notch filter will lower the solar radiation to less than 2% of the total solar radiation. Even at this reduced level, however, the ambient light incident on the detectors in the detector array 302 on a sunny day can be significant.

Figure 4A:
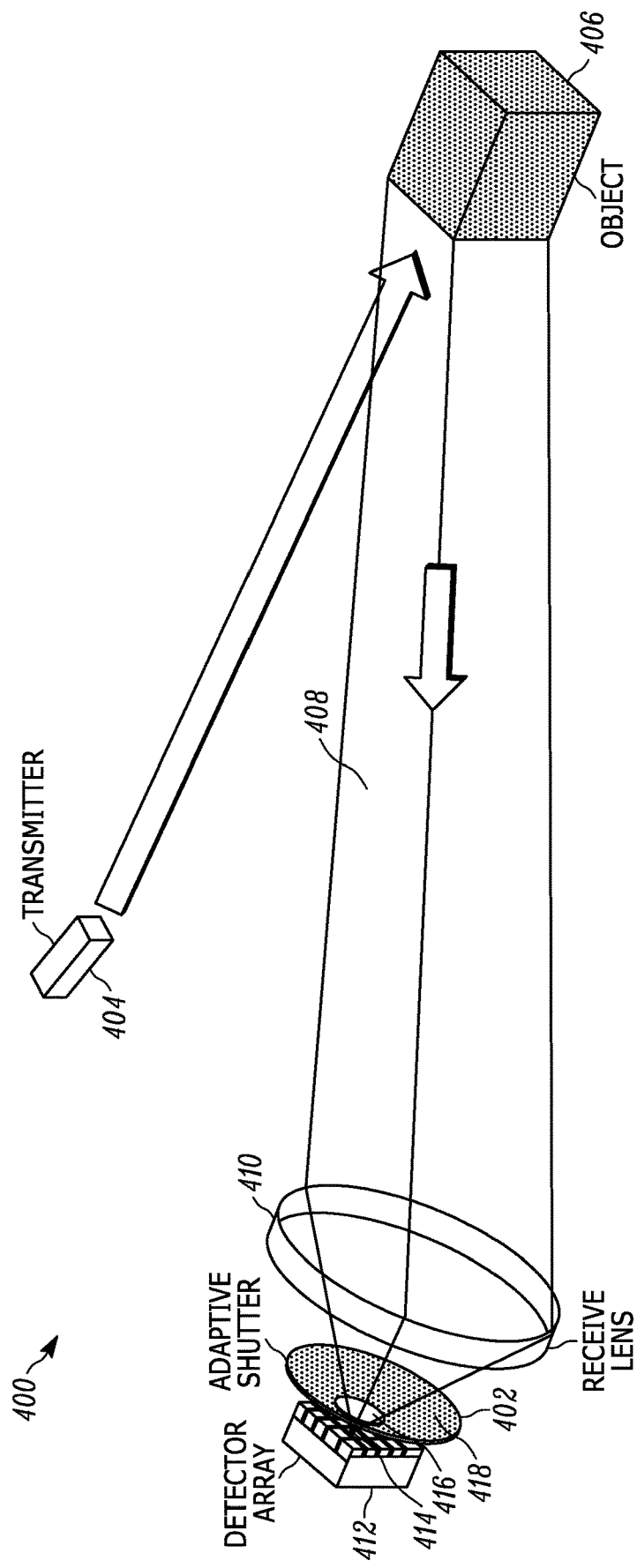
FIG. 4A illustrates a schematic diagram of an embodiment of an adaptive LIDAR system using a configuration of an adaptive shutter according to the present teaching.
Figure 4B:
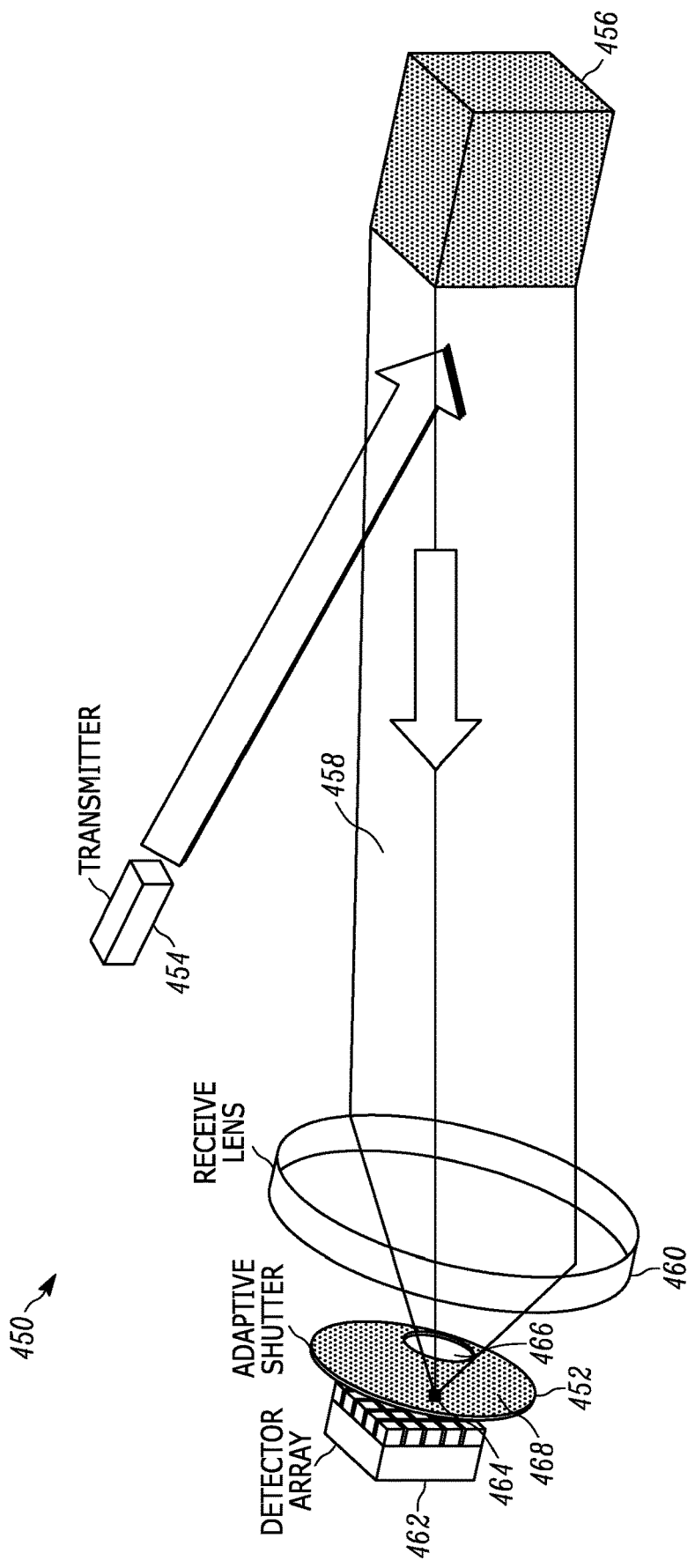
FIG. 4B illustrates a schematic diagram of an embodiment of an adaptive LIDAR system using another configuration of an adaptive shutter according to the present teaching.

One feature of the present teaching is that an adaptive shutter positioned between the object being interrogated and the detector array can be used to block light that can interfere with the ranging measurement. FIGS. 4A-B provide a simplified 3D representation to illustrate the concept of adapting the receive field-of-view. FIG. 4A illustrates a schematic diagram of a configuration of an embodiment of an adaptive LIDAR system 400 using an adaptive shutter 402 of the present teaching. A transmitter 404 emits an optical pulse which reflects off a target object, which is represented in the diagram as a cube 406. The reflected light 408 from the target object that is captured by the receiver lens 410 is focused onto the detector array 412 which sits nominally at the image plane. Only one detector element 414 within the 2D detector array 412 is needed to capture all of the light from the transmitter 404 that is reflected from the target object 406 as the target object 406 takes up only a portion of the receiver field-of-view. The adaptive shutter 402 is controlled to block substantially all of the light incoming onto the detector array 412 from other angles within the field-of-view of the two-dimensional detector array 412. This is represented in the figure by a smaller clear aperture 416 within a larger opaque structure 418 that is part of the adaptive shutter 402. In some embodiments, the transmitter 404 is a two-dimensional laser array. In these embodiments, for different lasers in the laser array, which correspond to different 3D measurement points, the LIDAR system will change the adaptive shutter 402, adjusting the location and size of the substantially transparent area 416, to correspond to the angular position of the current 3D measurement point that corresponds to the laser element that is activated within the receiver field-of-view.

FIG. 4B illustrates a schematic diagram of a second configuration of an embodiment of an adaptive LIDAR system 450 using an adaptive shutter 452 of the present teaching. In the embodiment shown in FIG. 4B, a transmitter 454, which may be the same transmitter in the same position as the transmitter 404 of FIG. 4A generates an optical pulse that reflects off a target object, which is represented in the diagram as a cube 456. The transmitter 454 may be a two-dimensional array of laser emitters. The target object represented by cube 456 is in a different position than the target object represented by cube 406 of FIG. 4A. Reflected light 458 from the target object represented by cube 456 captured by receiver lens 460 is focused onto the detector array 462 that is positioned nominally at the image plane. Only one detector element 464 within the 2D detector array 462 is needed to capture all of the light from the transmitter 454 that is reflected from the target object (cube 456) as the target object (cube 456) takes up only a portion of the receiver field-of-view.

The adaptive shutter 452 is controlled to block substantially all of the light incoming onto the detector array 462 from other angles within the field-of-view of the two-dimensional detector array 462. This is represented in the figure by a smaller clear aperture 466 within a larger opaque structure 468 that is part of the adaptive shutter 452. The smaller clear aperture 466 is in a different position within the larger opaque structure 468 that is part of the adaptive shutter 452. The reflected light 458 impinges on a detector element 464 at a different position in the two-dimensional detector array 462. Thus, FIGS. 4A-B show two different configurations of the adaptive shutter 402, 452 corresponding to two different positions of the object 406, 456 in the field-of-view in the case where the transmitter 404, 454 and the detector array 412, 462 are in the same position. Those skilled in the art will understand different configurations of the elements that can produce blocking of background light and passing measurement light using the adaptive shutter of the present teaching.

An adaptive optical shutter as described herein can be constructed in a variety of ways. For example, one embodiment of the optical shutter is a liquid crystal shutter. The liquid crystal shutter can be configured as a 2D array of pixels, where each pixel can be individually controlled. Those pixels corresponding to the current measurement field-of-view where light should pass through the liquid crystal shutter would be controlled to the "open" state, whereas the remainder of the pixels would be in the "closed" state. The region of "open" state corresponds to the transparent region field-of-view. The reported contrast ratio of liquid crystal optical shutters is as high as 1000:1 for "open" versus "closed" states. The size and shape of the "open" and "closed" state regions of the shutter can vary for different embodiments based on the shape and size of the region of pixels in the "open" or "closed" states. For example, referring to FIG. 4B, an "open" state is the region of pixels represented in the figure by the relatively small clear aperture 466 within the large opaque structure 468 that has pixels that are in a "closed" state.

Another embodiment of the optical shutter is an etalon cavity shutter formed using partially reflective micro-mirrors that can tune to reflect the incoming laser light based on wavelength. The etalon cavity shutter consists of a 2D array of pixels, where each pixel can be individually tuned. Each pixel is adjusted as required by the LIDAR system to reflect or pass the transmitter light. In such a system, the etalon also has the additional benefit of acting as a wavelength filter. The wavelength sensitivity of the etalon shutter is distinct from the liquid crystal shutter which is largely wavelength insensitive in the region of interest. The wavelength sensitivity of the etalon cavity shutter in a multi-wavelength LIDAR could also give additional flexibility to the LIDAR system, because, unlike a fixed thin-film filter, the etalon cavity can be tuned to pass or reject various wavelengths as desired in order to produce an adaptive receiver for both field-of-view and wavelength. The above description of optical adaptive shutters represents just two potential examples. One skilled in the art will appreciate that other optical shutter technologies can be used to realize an adaptive LIDAR system of the present teaching.

In the case of a silicon based detector technology, such as a silicon APD or silicon photomultiplier, then all or some portion of the optical shutter can potentially be integrated into the same silicon chip as containing the detector array.

This is possible with both liquid crystal and Micro-Electro-Mechanical System (MEMS) based optical shutter devices. One skilled in the art will appreciate that both transmissive and reflective devices can be used to provide an optical shutter according to the present teaching. For example, the effective transparent region of a reflective device is that region that reflects or passes the portion of the optical beam from the optical transmitter to the optical receiver.

Figure 5A:
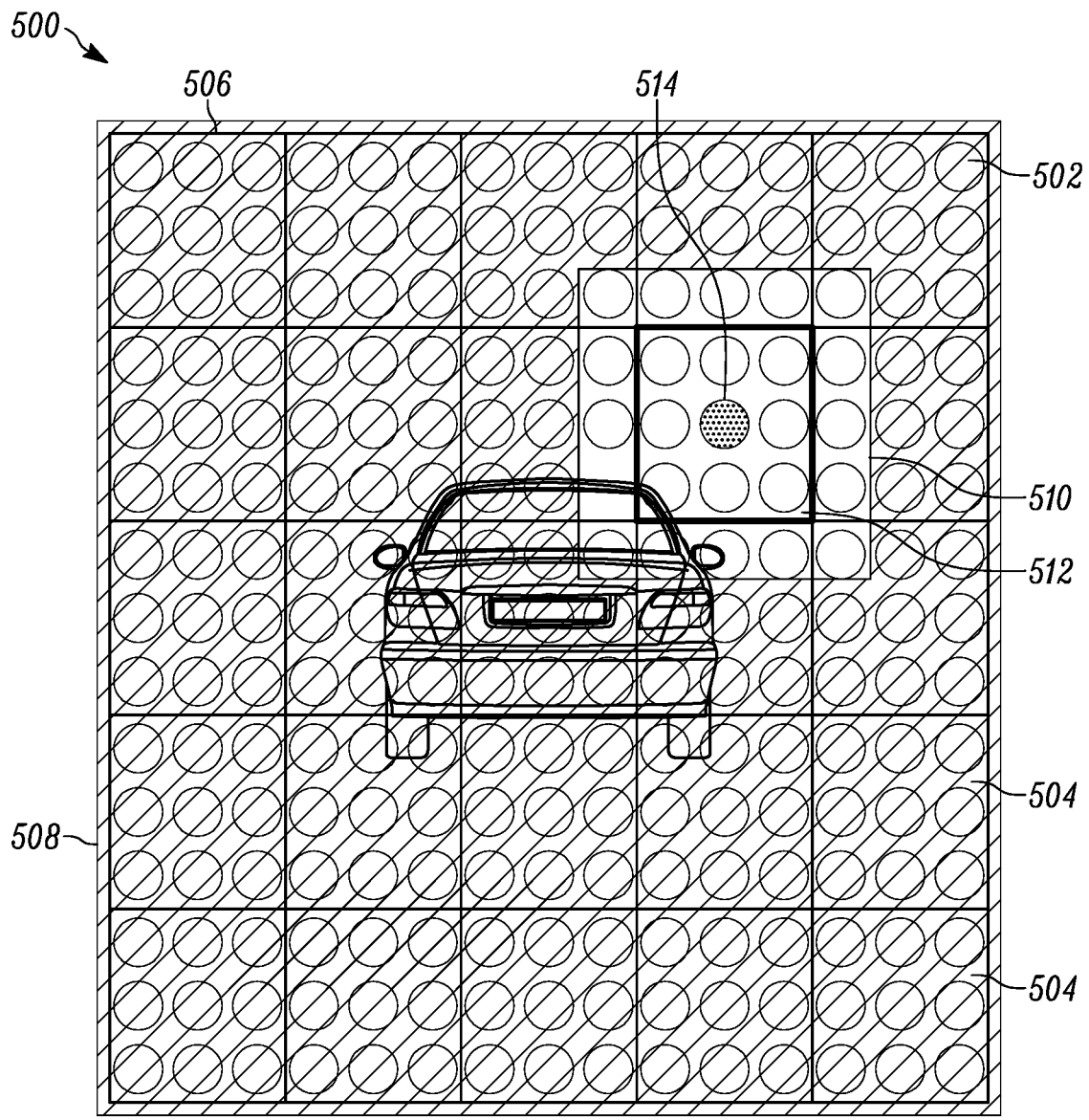
FIG. 5A illustrates a two-dimensional projection of the system FOV of the LIDAR system of FIG. 2 for an embodiment of a particular shutter FOV according to the present teaching.

One feature of the present teaching is that system performance can be controlled based on the configuration of the shutter. The transmitter and/or the detector provide different resolution and signal-to-noise ratios for different shutter fields-of-views. FIG. 5A illustrates a two-dimensional projection of the system field-of-view 500 of the LIDAR system of FIG. 2 for an embodiment of a particular shutter field-of-view of the present teaching. The system field-of-view 500 includes contributions from the various field-of-views that are provided by various parts of the system. In this embodiment, a two-dimensional array of laser field-of-views, which are represented by circles 502, are produced from each collimated optical beam produced by each laser element in the transmitter array.

The laser field-of-views shown by the 15×15 array of circles 502 are produced by a 15×15 array of laser elements. Various embodiments utilize various different sizes and shapes of laser field-of-view. An individual detector field-of-view is represented by smaller squares 504. The full detector array field-of-view is represented by the larger square 506 for this embodiment of a 5×5 detector array. The larger square 506 comprises a 5×5 array of small squares 504. The optical shutter blocked field-of-view is indicated by the square region 508 that covers the majority of the detector array. The optical shutter transparent field-of-view is indicated by the square 510. The optical shutter restricts the field-of-view to a size that is represented by the square 510, which is smaller than the total field-of-view of the detector array, large square 506, but that is larger than the field-of-view of a single detector element that is represented by the smaller square 512 that falls under the transparent field-of-view provided by the shutter represented by the square 510. A single activated laser element generates an optical beam that provides a measurement signal over the particular field-of-view that shown by the circle 514. In this case, the illumination pattern of the energized laser array in the illumination region is circle 514 that falls inside the field-of-view of a single detector in the array represented by square 512. In this configuration, ambient light will fall onto the detector element being used for the laser pulse measurement as well as some of the surrounding detectors because the shutter field-of-view is greater than a single detector field-of-view. However, it will be substantially blocked from the other detectors in the array that are not within the transparent field-of-view of the shutter, square 510.

Figure 5B:
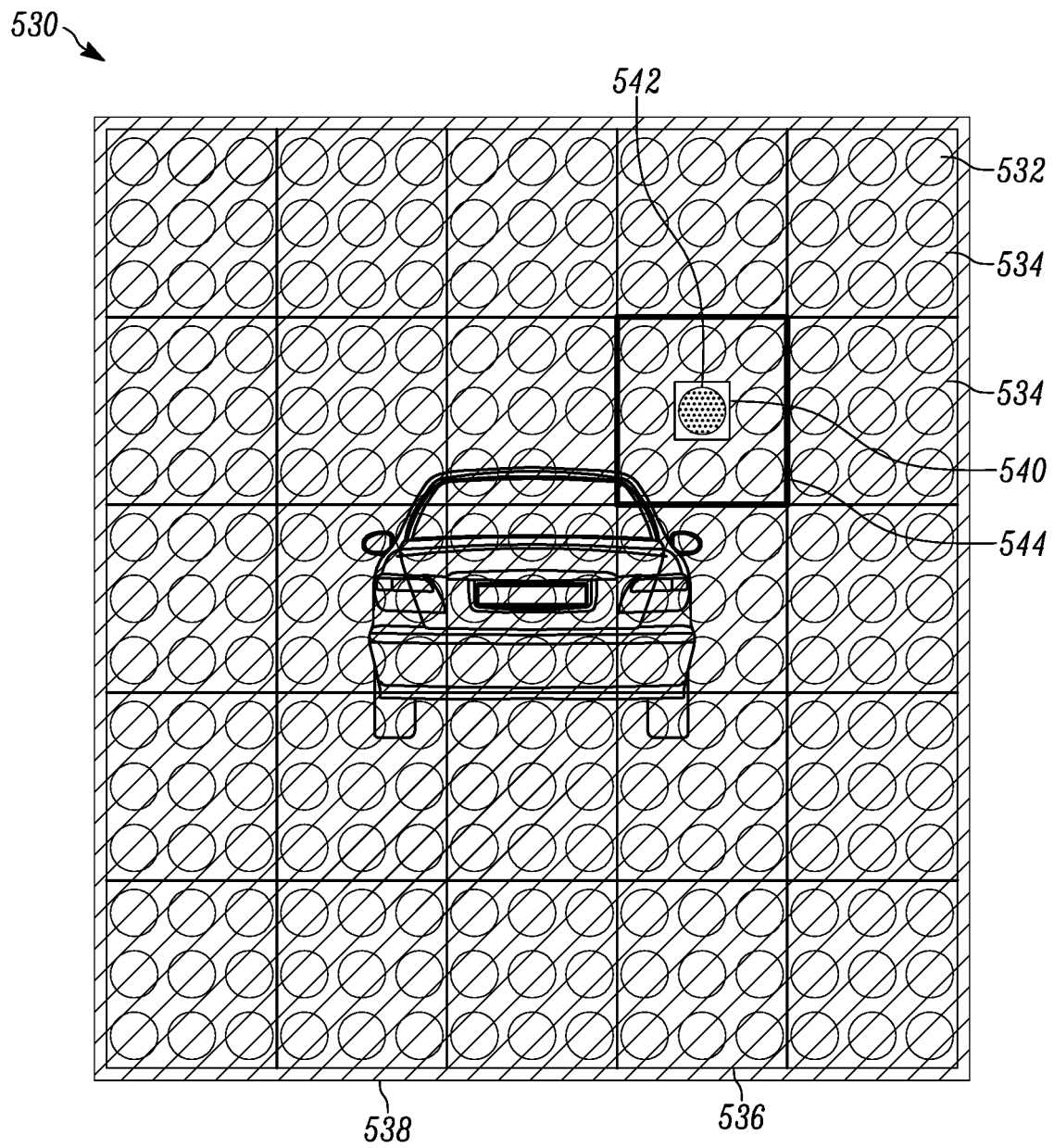
FIG. 5B illustrates a two-dimensional projection of the system FOV of the LIDAR system of FIG. 2 for another embodiment of a particular shutter FOV according to the present teaching.

FIG. 5B illustrates a two-dimensional projection of the system field-of-view 530 of the LIDAR system of FIG. 2 for another embodiment of a particular shutter field-of-view of the present teaching. The system field-of-view 530 includes field-of-views from each optical beam generated by a laser element in a two-dimensional array and shown as small circles 532. Small squares 534 represent the field-of-view for individual detectors. The large square 536 represents the field-of-view for a full detector array. The large square 538 is the field-of-view of the full optical shutter, and the square 540 is the transparent region of the shutter. The optical shutter is dimensioned to restrict the transparent field-of-view represented by square 540 to a size that is smaller than the field-of-view of a specific single detector element 544.

The optical shutter is also dimensioned so as to not attenuate the received light from the laser transmitter pulse that generates the optical beam field-of-view, which is represented by circle 542. The optical shutter configuration of the LIDAR system of FIG. 5B has improved signal-to-noise ratio performance compared to the optical shutter configuration of the system illustrated in FIG. 5A at least because the optical shutter in FIG. 5B reduces more ambient light falling onto the detector array without attenuating the transmit optical pulse power that is received. Said differently, the optical shutter blocks more interfering light and does not block measurement signal light (that is, the signal light stays the same). In general, using this teaching illustrated in FIG. 5B, the ratio of the transparent region field-of-view of the optical shutter to the field-of-view of at least one of the plurality of detectors in the detector array can be chosen to achieve a particular resolution of the LIDAR system depending on the specific requirements of the system.

Figure 5C:
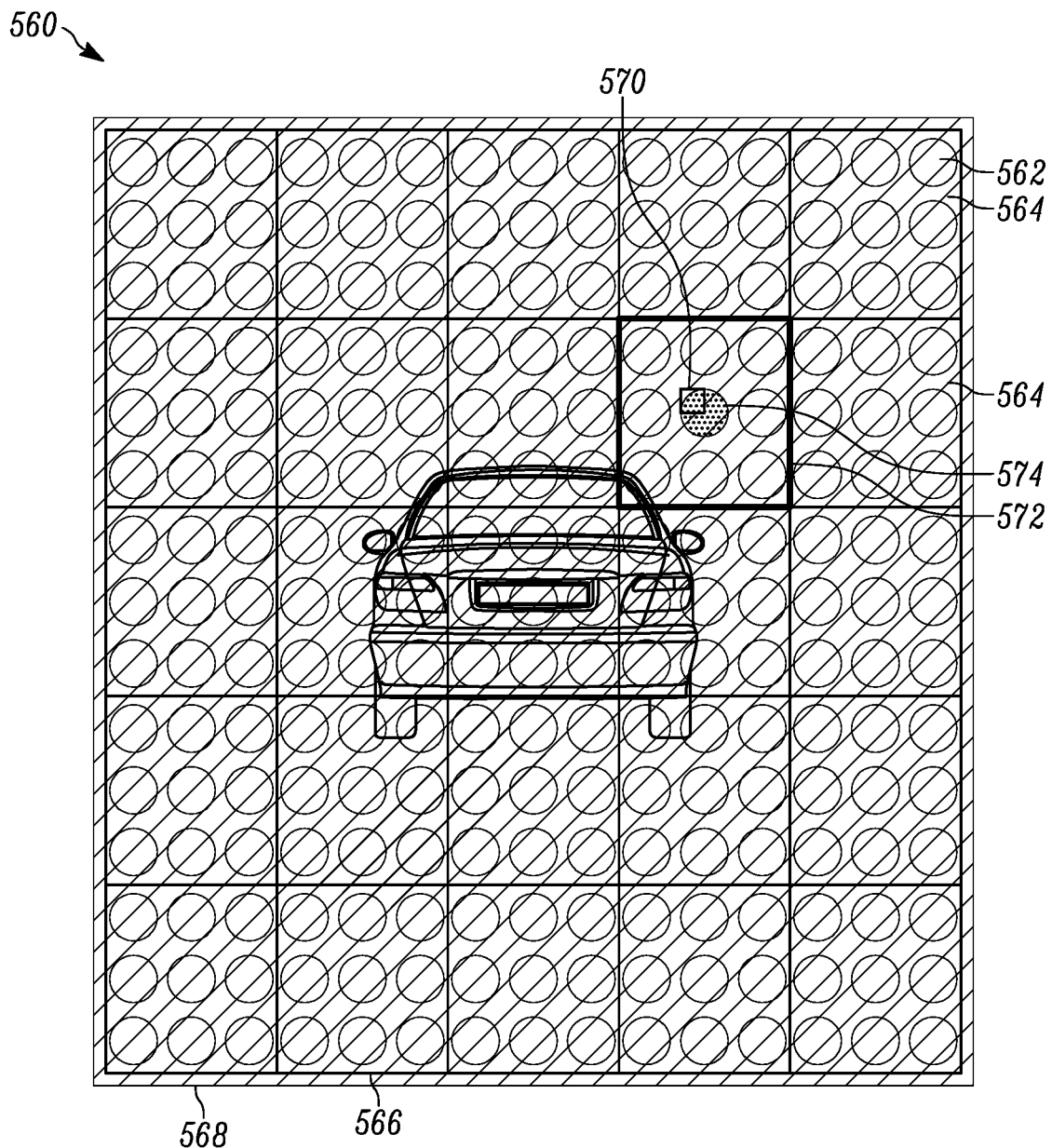
FIG. 5C illustrates a two-dimensional projection of the system FOV of the LIDAR system of FIG. 2 for yet another embodiment of a particular shutter FOV according to the present teaching.

FIG. 5C illustrates a two-dimensional projection of the system field-of-view 560 of the LIDAR system of FIG. 2 for another embodiment of a particular shutter field-of-view according to the present teaching. As with the projections shown in FIGS. 5A-B, there are laser measurement field-of-views represented as circles 562, individual detector field-of-views represented by small squares 564, a full 2D detector field-of-view represented as large square 566, and a full shutter field-of-view represented as large square 568. The open state of the shutter produces small square 570 near the active detector field-of-view represented by square 572, and active laser measurement spot represented by circle 574.

The optical shutter restricts the transparent region field-of-view to a size represented by small square 570 that is smaller than the field-of-view of a single detector represented by square 572, and also that is smaller than the field-of-view illuminated by the laser transmitter pulse represented by the circle 574. In this configuration, only one-quarter of the transmit pulse, represented by the upper left quadrant, hits the detector array. The LIDAR system of the optical shutter configuration embodiment of FIG. 5C has a 3D measurement resolution four times larger than the shutter configuration described in connection with the embodiments illustrated in FIG. 5A or FIG. 5B because the optical shutter allows sampling of a subset of the field-of-view of a single laser pulse represented by circle 574. The 3D measurement resolution of the system in FIG. 5C is now determined by the optical shutter configuration, and not by the number of lasers in the system or by the collimation of each laser optical beam. Of course, there is a performance tradeoff. The LIDAR system shown in FIG. 5C will have a lower signal-to-noise ratio since only a portion of the received laser pulse is used for a time-of-flight measurement. In general, using this teaching illustrated in FIG. 5C, the ratio of the transparent region field-of-view of the optical shutter to the field-of-view of at least one of the plurality of lasers in the laser array can be chosen to achieve a particular resolution of the LIDAR system depending on the specific requirements of the system, such as a desired SNR.

To be more explicit about the impact of the different field-of-views of the LIDAR system optical components, the following parameters are defined: (1) $FOV_T$=Divergence (projected conic) of a single laser element in the transmitter; (2) $FOV_D$ field-of-view of a single detector element (e.g. pixel) in the detector array; and (3) $FOV_S$=field-of-view corresponding to the effective aperture of a single pixel of the optical shutter or mirror, which is the transparent region field-of-view.

For many of the embodiments of the LIDAR systems of the present teaching, the $FOV_T$ is less than $FOV_D$. Having $FOV_T$ less than $FOV_D$ is a major difference between the solid-state LIDAR system embodiments of the present teaching and known so-called flash based LIDAR systems. In flash-based LIDAR, $FOV_T > FOV_D$. The measurement resolution of these flash LIDAR systems is determined by $FOV_D$, and simultaneous 3D measurements are made using a 1D or 2D array of detectors. In contrast, for many embodiments of LIDAR systems of the present teaching, signal-to-noise ratio performance is significantly improved compared to flash-based LIDAR because $FOV_T < FOV_D$.

In addition, one feature of the present teaching is that some embodiments of LIDAR systems of the present teaching implement a shutter or mirror with $FOV_S$ that is independent of $FOV_T$ and $FOV_D$. That is in various embodiments, $FOV_S$ can be different from either $FOV_T$ or $FOV_D$. For LIDAR systems configured with $FOV_S < FOV_D > FOV_T$, the signal-to-noise ratio performance is improved compared to a system without the adaptive shutter/mirror by suppression of the ambient solar noise on the detector. For LIDAR systems configured with $FOV_S < FOV_T > FOV_D$, the 3D measurement resolution is determined by the adaptive shutter/mirror, enabling a higher measurement resolution. Signal-to-noise ratio is typically reduced in this case since only a portion of the transmitter light is being used, even though additional suppression of ambient solar noise is being performed.

Figure 6:
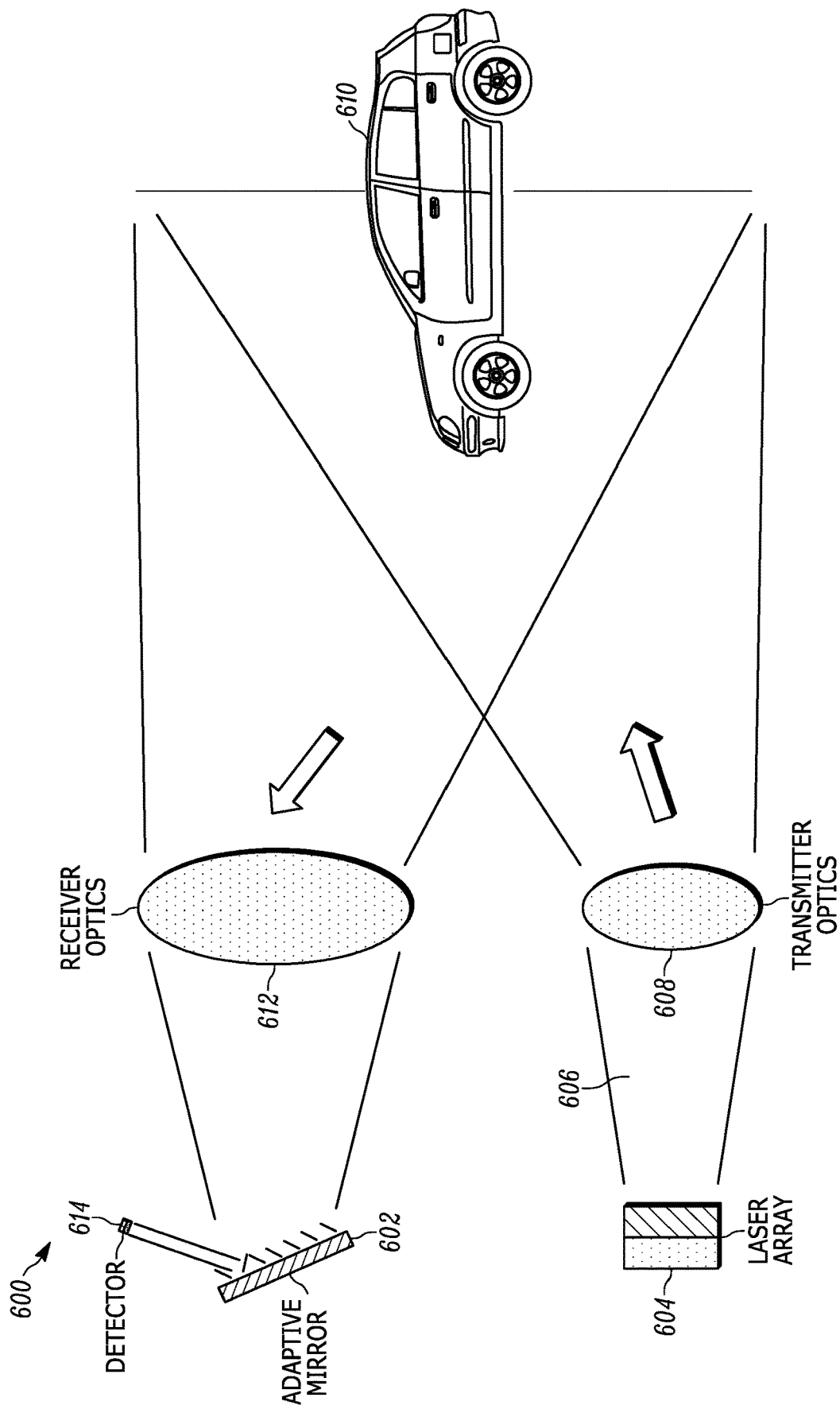
FIG. 6 illustrates a schematic diagram of an embodiment of an adaptive FOV LIDAR system using an adaptive mirror according to the present teaching.

FIG. 6 illustrates a schematic diagram of an embodiment of an adaptive FOV LIDAR system 600 using an adaptive mirror 602 according to the present teaching. In this embodiment, an adaptive mirror 602 is used to control the field-of-view of light impinging on a detector 614 instead of an optical shutter. A transmitter 604, which may be a laser array, emits an optical beam 606 that is projected to a target range by transmit optics 608. The transmit optics 608 may be a single lens, or it may include multiple lenses and/or other optical elements known in the art. Light is reflected at the target range by an object 610. Reflected light is collected by receive optics 612 and projected onto the adaptive mirror 602. The receive optics 612 may be a single lens, multiple lenses, and/or include other optical elements that project the light reflected from the object 610. The adaptive mirror 602 selectively projects the reflected light to a detector 614. The detector 614 may be an array of detector elements. As described herein, the region of the adaptive mirror that reflects light to the detector would be considered a transparent region. This region is also referred to as the reflected region field-of-view.

The adaptive mirror 602 is constructed in such a way as to create a 2D matrix of mirrors that can be controlled in such a fashion as to reflect a portion of the light in one direction, while deflecting the remainder of the light in a different direction. The light corresponding to the desired field-of-view for the measurement is reflected by the adaptive mirror to the detector 614. Thus, the adaptive mirror 602 generates a reflected region field-of-view at the detector 614, thereby restricting illumination at the input of the optical receiver to a region which is smaller than the optical receiver field-of-view. The configuration of the adaptive 2D mirror 602 depends on the coarseness of the array (e.g. number of pixels desired) and can be constructed in a variety of ways.

In one embodiment, an adaptive field-of-view LIDAR system receiver according to the present teaching utilizes an optical receiver with a field-of-view of 45 degree×30 degree. This embodiment includes a transmitter comprising a plurality of lasers each with a field-of-view of ~0.25 degrees. For an adaptive mirror with 1920×1080 pixels, which can adaptively reflect across the 45 degree×30 degree field-of-view of the receiver, a region of 10×9 pixels would correspond to 0.25×0.25 degree field-of-view. Thus, in order to capture the full reflected power from a single laser, you need to use 10×9=90 pixels. However, we can always choose to use either more or less pixels to reflect the optical beam from a single laser. In state-of-the-art LIDAR systems, the receiver must have a large dynamic range to capture both small return signals from distant, low reflectivity objects, as well as large signals from close, highly reflective objects. Objects that are close often will saturate the receiver with too high optical input power to the detector.

In this embodiment of a LIDAR system with an adaptive mirror, we can choose to attenuate the laser pulse by using fewer mirrors than what corresponds to the full return pulse field-of-view. For example, this embodiment could support a configuration having only one mirror reflecting the optical beam, which would result in 1/90 of the return light from the laser pulse going to the detector. Such a system can be used to further improve the dynamic range of a LIDAR system and, in particular, can provide a desired dynamic range of the LIDAR system based on a ratio of the transparent region field-of-view of the optical shutter and the field-of-view of at least some of the plurality of lasers. The values of the fields-of-view in this particular embodiment are only to illustrate the present teaching and that many other values can be used.

Many different types of MEMS or even hybrid structures could be used to construct the adaptive 2D mirror 602. One example of an adaptive mirror using MEMS fabrication techniques with a high pixel count is the DLP6500 Digital Micromirror Device manufactured by Texas Instruments. The DLP6500 contains >2 million micromirrors. The high pixel count of the DLP6500 would allow implementation of a LIDAR system with an adaptive mirror that determines the 3D measurement resolution as described in connection with the embodiment illustrated in FIG. 5C. It should be understood that the embodiment of the adaptable LIDAR system illustrated in FIG. 6 is only meant to represent some features of the present teaching. Additional optical elements, such as lenses and prisms would be included in a practical optical design that performs the required beam steering functions.

Figure 7A:
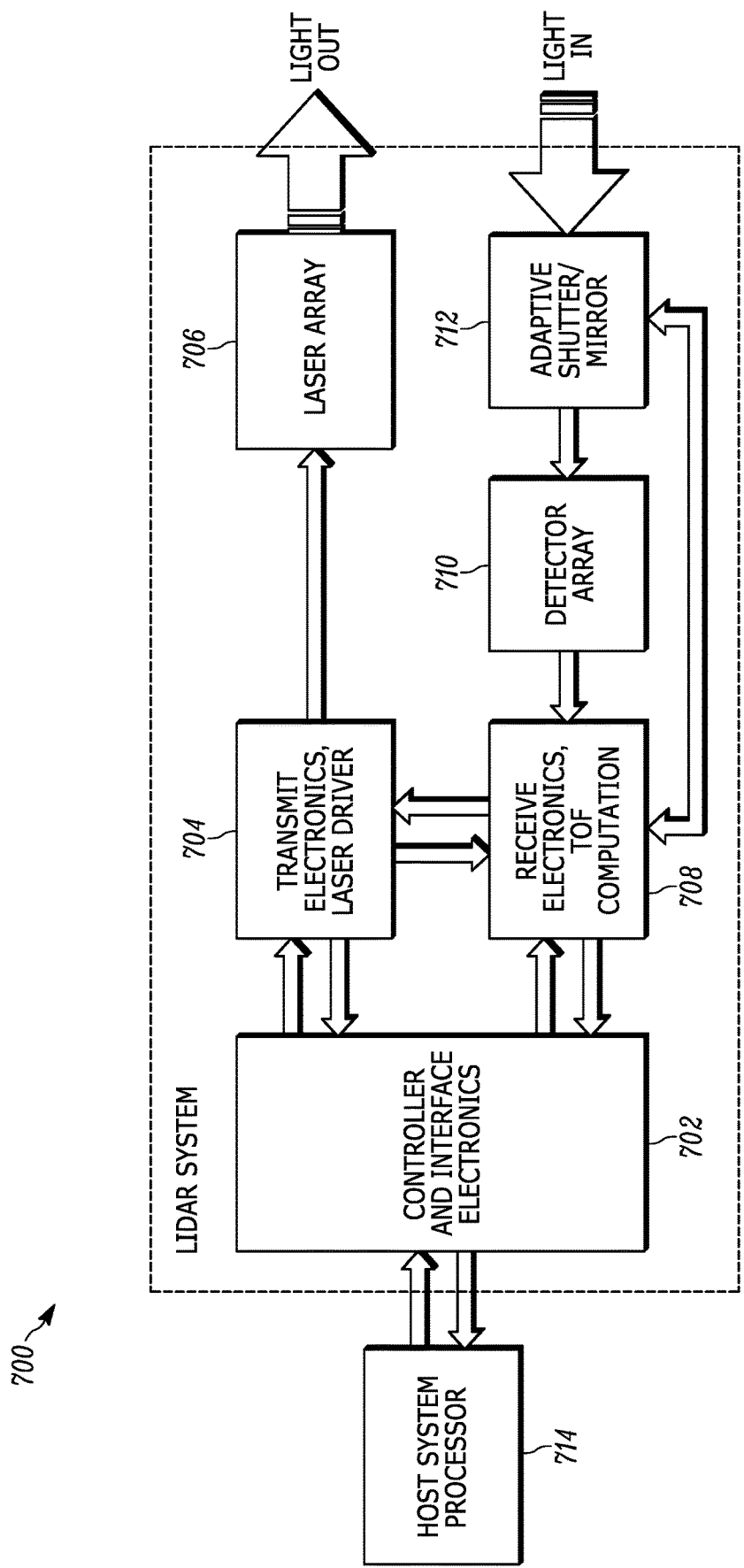
FIG. 7A illustrates a block diagram of an embodiment of an adaptive LIDAR system of the present teaching.

FIG. 7A illustrates a block diagram of an embodiment of an adaptive LIDAR system 700 according to the present teaching. The LIDAR system 700 has six main components: (1) controller and interface electronics 702; (2) transmit electronics including laser driver 704; (3) the laser array 706; (4) receive and time-of-flight computation electronics 708; (5) detector array 710; and the (5) adaptive shutter/mirror 712. The controller and interface electronics 702 controls the overall function of the LIDAR system 700 and provides the digital communication to the host system processor 714. The transmit electronics 704 controls the operation of the laser array 706 and sets the pattern of laser firing. The receive and time-of-flight computation electronics 708 receives the electrical detection signals from the detector array 710 and then processes these electrical detection signals to compute the range distance through time-of-flight calculations. The receive electronics 708 also controls the adaptive shutter 712 based on information received from the controller and interface electronics 702 and/or the transmit electronics 704. In some embodiments, the controller and interface electronics directly controls the adaptive shutter/mirror rather than the receive electronics. The downstream transmit and receive optics and the objects that are positioned at a target range are not shown in the LIDAR system of FIG. 7A.

The adaptive LIDAR system 700 thus comprises an optical transmitter comprising a plurality of lasers in laser array 706, where each of the plurality of lasers in the laser array 706 illuminate a field-of-view. A transmitter controller having a plurality of electrical outputs connects to the laser array 706. In the embodiment illustrated in FIG. 7A, the transmitter controller includes elements in the controller and interface electronics 702 and elements in the transmit electronics and laser driver 704. The laser driver 704 is able to individually activate the laser elements in laser array 706. Thus, the transmitter controller includes a plurality of electrical outputs where a respective one of the plurality of electrical outputs connects to an input of a respective one of the plurality of lasers in the array 706. In an alternative embodiment, the transmitter controller includes a plurality of electrical outputs that connect to inputs of a plurality of lasers in the array 706 in any desired configuration using matrix addressing where rows and columns are addressed according to a desired addressing scheme.

Referring to both FIGS. 2 and 7A, in some embodiments, the transmitter controller is configured to generate electrical pulses at the plurality of electrical outputs to activate the lasers in the array 202, 706 such that the plurality of lasers generates light in a desired pattern in the illumination region at the plane of detector array 210, 710. The detector array 210, 710 has a field-of-view that includes the field-of-view of each of the plurality of detectors that are position to detect light across the illumination region. The detectors in the array 210, 710 are connected to receive electronics 708 that includes time-of-flight measurement circuit 708 that determines the time-of-flight of light from the plurality of lasers in the array 706 to the plurality of detectors in the array 710. The receive electronics 708 also calculates range information from the time-of-flight measurements. An adaptive optical shutter 212, 712 positioned between the optical transmitter and the optical receiver has a transparent region field-of-view in the illumination region and restricts illumination at the input of the optical receiver such that the transparent region field-of-view is smaller than the field-of-view of the input of the optical receiver.

Figure 7B:
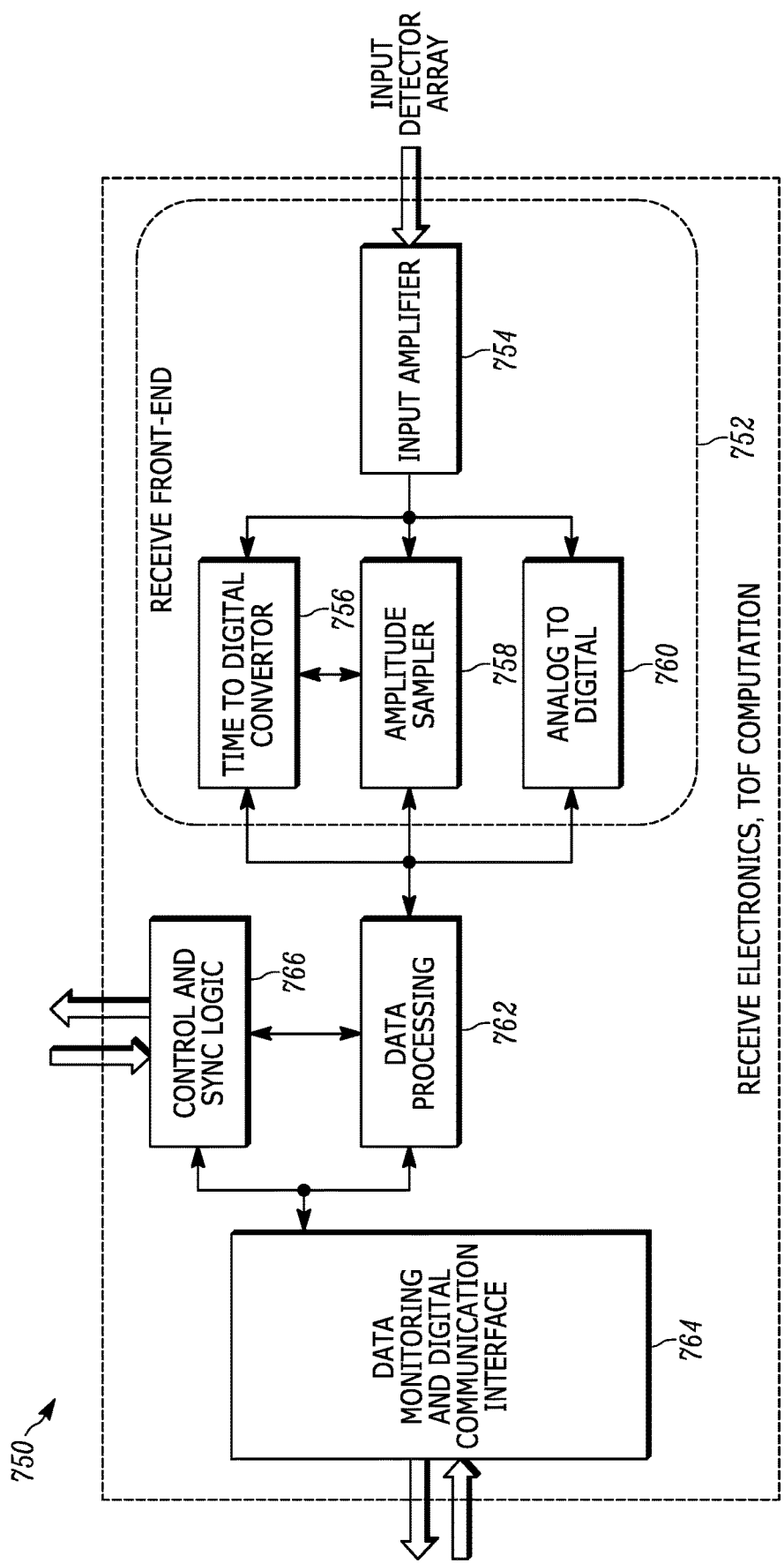
FIG. 7B illustrates a detailed block diagram of an embodiment of the receiver and TOF computation electronics described in connection with FIG. 7A.

FIG. 7B illustrates a detailed block diagram of an embodiment of the receiver and time-of-flight computation electronics 750 described in connection with FIG. 7A. A receive front end 752 is electrically connected to an output of a detector array (not shown). The receive front end includes an input amplifier 754 that sends signals to various circuits (some optional), such as a Time-to-Digital Converter (TDC) 756, an amplitude sampler 758, and an analog-to-digital converter 760. These circuits communicate with a data processor 762. The data processor 762 is connected to a data monitoring and digital communication interface 764 and to a control and synchronization logic circuit 766 that is also connected to the data monitoring and digital communication interface 764.

The received electrical detection signal from the detector array is input to the receiver front-end 752 and sent to the input amplifier 754 that boosts the received electrical detection signals from the detector before further processing. The signal output from this amplifier is then split to several different circuits. In various embodiments, three possible circuits, the time-to-digital converter 756, the amplitude sampler 758, and the analog-to-digital converter 760 can be used together or in any combination. The time-to-digital convertor 756 is a specialized circuit that recognizes when the input signal crosses some amplitude threshold, and then provides a digital representation of the time of that event. For a time-of-flight measurement system, the event typically corresponds to the arrival of a reflected transmit pulse and the time of this arrival corresponds to the distance of the object. The amplitude signal block 758 is a circuit that is triggered by the same event as the time-to-digital convertor 756, but instead of recording the time, it records the amplitude. The analog-to-digital circuit 760 converts the analog received electrical detection signals into a digital signal corresponding to some sampling rate. The processed signals received from the receiver front end are then input to a data processing circuit 762 that interfaces with a trigger and sync lock circuit 766. A data monitoring and digital communication interface 764 then sends signals to the controller and interface electronics as shown in FIG. 7A.

In the embodiment of the receive electronics and time-of-flight computation circuit 750 shown in FIG. 7B, the input from the detector array is input to a single time-of-flight measurement circuit. All of the detectors are connected in such a way as to combine their outputs and direct to a single time-of-flight measurement circuit. This feature simplifies the time-of-flight circuit and lowers cost. However, the noise from all the detectors can combine in this system and degrade the signal-to-noise of the measurement signal. The adaptive shutter/mirror shown in FIG. 7A is used to minimize the noise contribution to the system from solar radiation by reducing the illumination on those portions of the detector array not corresponding to the current measurement point.

In other embodiments of the receive electronics and time-of-flight computation circuit of the present teaching, not all detectors are combined to a single TOF measurement circuit, but instead some subset of detectors may be grouped with each subset having its own TOF circuit. In these embodiments, the adaptive shutter/mirror is used to restrict the light falling onto a portion of detectors making up one subset as defined by a shared time-of-flight measurement circuit.

One skilled in the art will appreciate that the block diagrams shown in FIGS. 7A-B, which illustrate functions of the LIDAR system, are not limiting the present teaching to any specific hardware configuration. For example, each of these circuits may be separate circuits or integrated. Also, the transmit and receive blocks may be on separate printed circuit board assemblies (PCBA) and/or separate modules. For the receive electronics block, all or part of the front end, may be part of an integrated circuit that is attached directly to the detector array, or these circuits can be on the PCBA with other circuits. In some embodiments, the controller function might be combined with some or all of the transmit and receive electronics inside a field programmable gate array (FPGA), application-specific integrated circuit (ASIC) or similar type of integrated or hybrid device.

Figure 8:
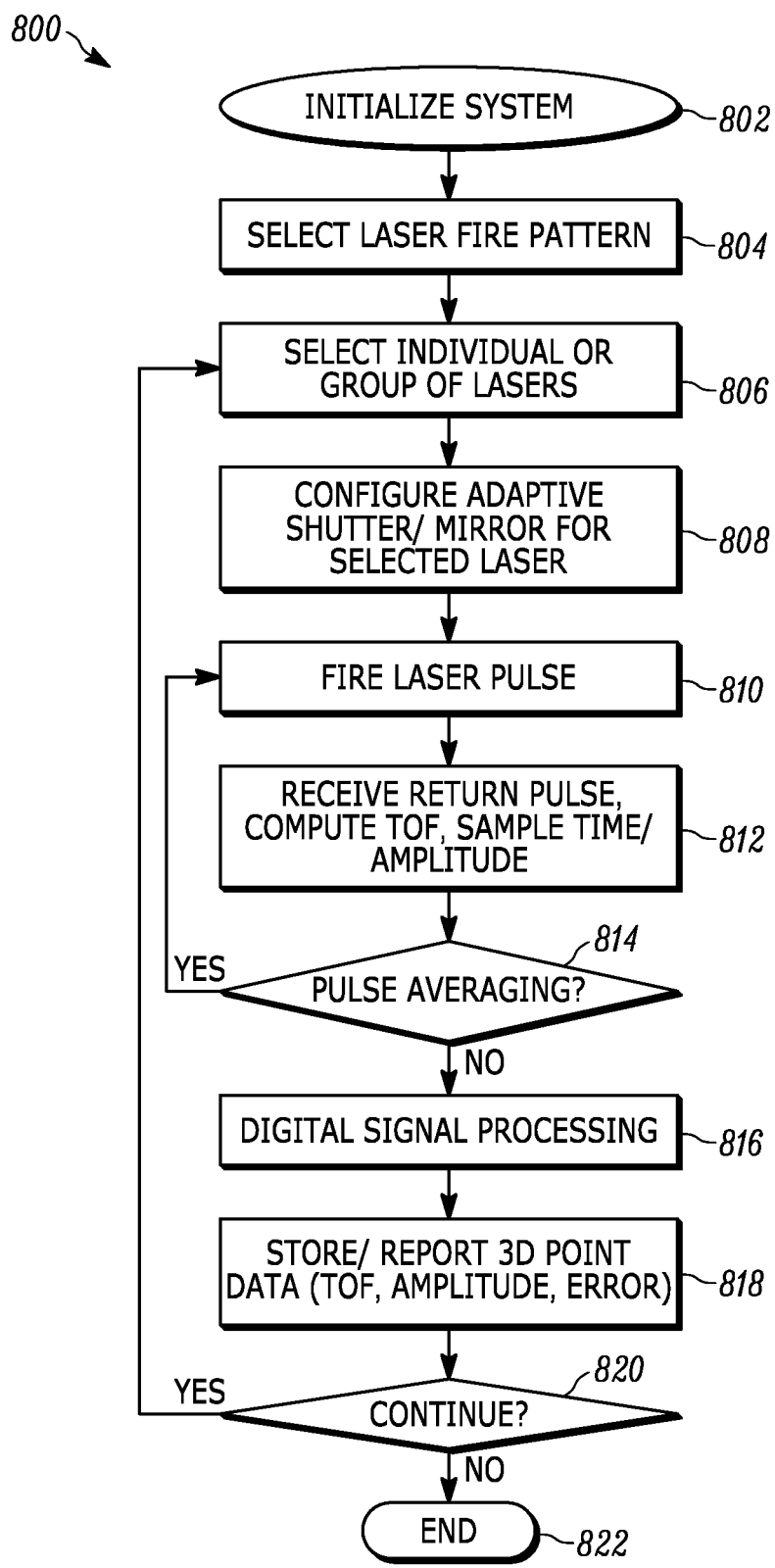
FIG. 8 illustrates a flow chart of an embodiment of a method of implementing an algorithm of the LIDAR system according to the present teaching.

FIG. 8 illustrates a flow chart of an embodiment of a method 800 of implementing an algorithm of the LIDAR system according to the present teaching. In the first step 802 of the method 800, a controller is initialized. The controller can be any controller that is connected to both the transmit array and detector array of the noise-adaptive solid-state LIDAR system. For example, the controller can be the controller described in connection with FIG. 7A.

In the second step 804 of the method 800, a desired illumination pattern for generating the 3D point cloud is selected by the controller. The illumination pattern includes a particular illumination spatial shape that can change as a function of time. The controller is configured to pulse individual lasers, or groups of lasers, on and off to provide a desired illumination pattern at the target range and associated illumination region on the detector array. In some embodiments, the pattern is a simple row-by-row scan of each laser element in a row, continually repeated to provide a uniform refresh rate. In other embodiments, the pattern is pseudo-random where the system moves from measurement point to measurement point in a non-continuous manner that still acts to cover the full field-of-view of the entire transmitter array uniformly over time.

In the third step 806 of the method, the controller selects an individual laser, or group of lasers, to fire based on the desired pattern. The controller then configures the adaptive shutter/mirror to block illumination of the portions of the detector array not needed to measure the reflected transmitted laser pulse in step four 808.

In the fifth step 810 of the method 800, the LIDAR system fires the laser or lasers that have been selected in the third step 806. In the sixth step 812 of the method 800, the LIDAR system receives at the controlled detector array, the optical pulses from the fired lasers and calculates the time-of-flight and samples amplitude/time as desired. The system determines whether pulse averaging is implemented in the seventh step 814. If pulse averaging is implemented, then the method loops back to the fifth step 810 and the sixth step 812 of the method, firing the same laser, or groups of lasers, and taking measurements on the received signal from that laser, or groups of lasers, as many times as required by the desired amount of averaging. For example, in one specific method according to the present teaching, the averaging fires up to four pulses in order to improve the SNR. In other specific methods according to the present teaching, the averaging fires a larger number of pulses, for example up to twenty-five or more pulses. Firing a larger number of pulses takes a longer period of time, but provides more improvement in SNR than pulse averaging.

Thus, in some embodiments of the present teaching, a combination of multiple measurement points using multiple laser pulses in a particular field-of-view is averaged to determine object distances to improve the signal-to-noise ratio. Multiple pulses from the same laser are averaged at the detector to increase the signal. Various embodiments use different numbers of pulses. While more pulses lead to a better signal-to-noise ratio, the system is limited in how many pulses can be averaged based on the time allowed by the system refresh rate. In some embodiments four or more pulses are used. In other embodiments, ten or more pulses are used, and in still other embodiments more than twenty-five pulses are used.

In the eighth step 816 of the method 800, after obtaining the desired number of pulses for an individual laser or lasers, the system can apply digital signal processing to manipulate the data in some fashion. After processing, the controller stores and/or communicates the data in the ninth step 818 of the method 800. In the tenth step 820 of the method 800, a decision to stop or continue is made. The controller then moves onto the next laser in the pattern at the third step 806 of the method 800. The system continually operates to sweep through the desired pattern until stopped at the eleventh step 822 of the method 800.

Figure 9:
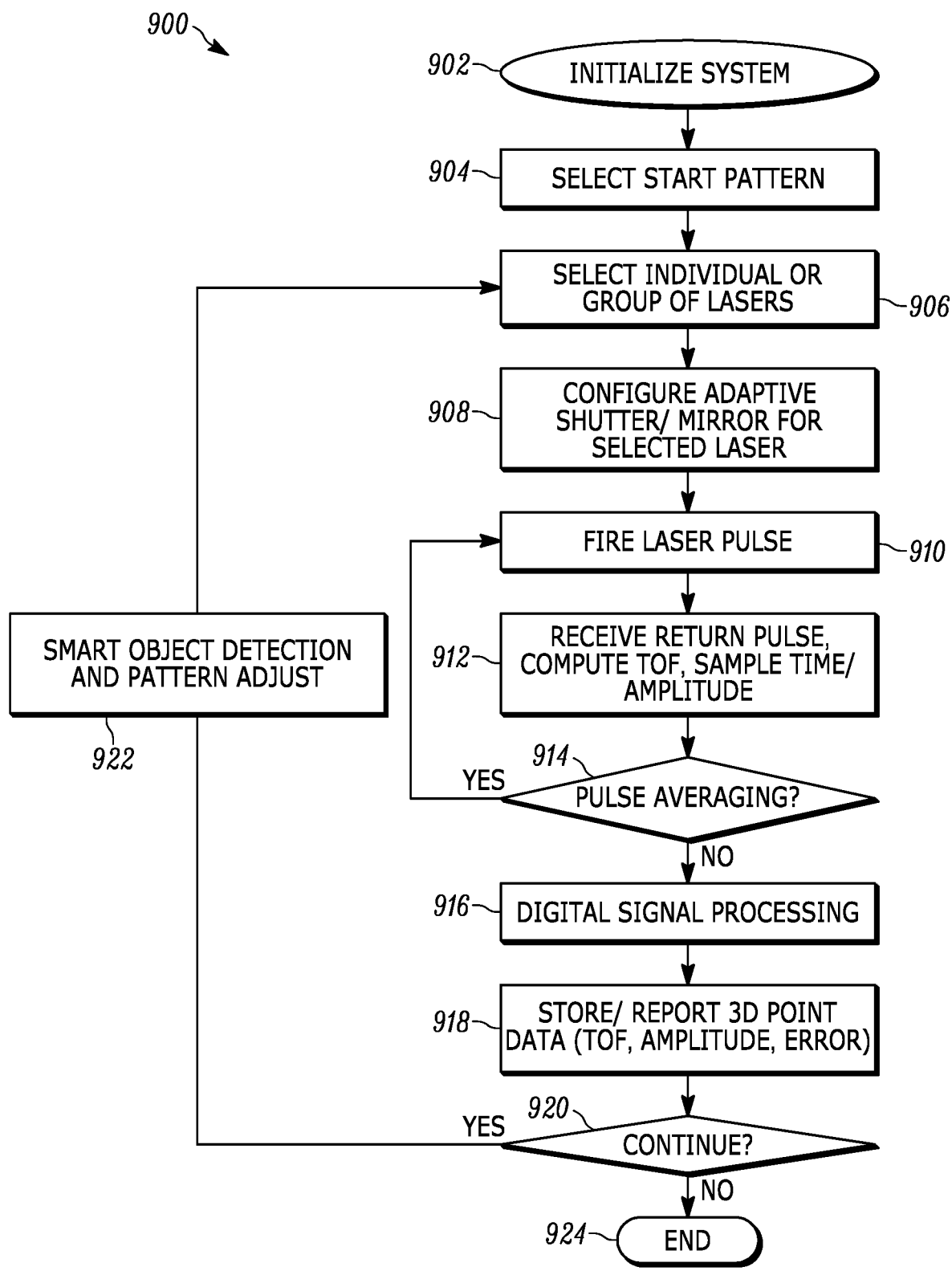
FIG. 9 illustrates a flow chart of an embodiment of a method to implement an algorithm of the noise-adaptive solid-state LIDAR system according to the present teaching that incorporates smart object detection.

FIG. 9 illustrates a flow chart of an embodiment of a method 900 to implement an algorithm of the noise-adaptive solid-state LIDAR system of the present teaching that incorporates smart object detection. Several steps of the method 900 are similar or identical to the method 800 described in connection with FIG. 8. In the first step 902 of the method 900, the system is initialized. In the second step 904 of the method 900, a desired illumination pattern for generating the 3D point cloud is selected by the controller. In the third step 906 of the method 900, the controller selects an individual laser, or group of lasers, to fire based on the desired pattern. The controller then configures the adaptive shutter/mirror to block illumination of the portions of the detector array not needed to measure the reflected transmitted laser pulse in a fourth step 908.

In the fifth step 910 of the method 900, the LIDAR system fires the laser or group of lasers that have been selected in the third step 906. In the sixth step 912 of the method 900, the LIDAR system receives the fired laser pulses at the controlled detector array and calculates time-of-flight and samples amplitude/time as desired. The system then determines whether pulse averaging is implemented in step seven 914 of the method 900 and loops back to the fifth step 910 of the method 900 until the desired number of pulses have been fired. In step eight 916 of the method 900, after obtaining the desired number of pulses for an individual laser, or groups of lasers, the system applies digital signal processing to manipulate the data in various ways. After processing, the controller stores and/or communicates the data in the ninth step 918 of the method 900.

In the tenth step 920 of the method 900, a decision to stop or continue the method 900 is made. If the decision is to continue the method 900, the system moves to the eleventh step 922 of the method 900 where a smart object detection and pattern adjust is performed. In this eleventh step 922 of the method 900, the controller has the ability to analyze the 3D point cloud and make decisions to adjust the pattern of the laser firing, as well as the pulse averaging to either address specific rules and/or to optimize the overall performance. For example, one rule could be if the controller determines an object might potentially collide with the vehicle, that the LIDAR system "lock onto" that object and change the pattern of firing and/or the field-of-view in order to increase the refresh rate and/or accuracy of the measurements of that object. In another embodiment, the controller might adjust the amount of pulse averaging, or firing patterns, for each individual laser based on various criteria such as a calculated probability of detection, error rate, distance to objects measured for each laser, and/or environmental conditions. The system then moves to the twelfth step 924 of the method 900 to end the method 900 if a decision to stop is made.

Solid-state LIDAR system configurations that implement the algorithm of the noise-adaptive solid-state LIDAR system of the present teaching described in connection with FIG. 9 have significant performance advantages compared to known LIDAR system that uses mechanical scanning. For example, some of the mechanical scanners used in known LIDAR systems include rotating motors, MEMS mirrors, and Galvanometers. In mechanical scanning LIDAR systems, it is not possible to arbitrarily measure different points at any time within the field-of-view because the mirror or motor must be physically moved. Consequently, the number of pulses that are able to be used for averaging is significantly constrained when compared to LIDAR systems according to the present teaching, for example. This point is illustrated in connection with FIG. 10.

FIG. 10 illustrates a table 1000 of operating parameters for a known MEMS based scanning LIDAR system. From the parameters listed in the table 1000, we can determine the capability of the system to implement pulse averaging. For light to travel out and back 150 meters, the time required is one microsecond. Consequently, the maximum rate at which the system can fire pulses and be able to identify without ambiguity the reflection for each pulse is 1 MHz, without taking into account processing overhead. The number of measurement points produced by the system for the stated field-of-view, and angular resolution is 25,000 points per frame. With a 30 Hz refresh rate, the system must be capable of measuring 750K points in one second.

When we compare this required 3D point measurement rate to the speed of light limited 1 MHz maximum pulse rate, we can understand clearly that for such a system, pulse averaging cannot be implemented uniformly, as even two times pulse averaging for all points would require a 1.5 MHz pulse rate, which would reduce the maximum range from 150 m to 100 m. Also, since the mirror is always moving, no two points identically overlap, which puts another limitation on pulse averaging. In a LIDAR system configured as described by the table 1000, the time it takes to move from one point to the next adjacent point (0.2°), is equal to 1.3 microsecond. Since we can only fire a pulse every 1.0 microsecond, it follows that averaging multiple pulses also requires significant temporal averaging. By the time a second pulse is fired, the system scanning mechanism has substantially moved already to the next measurement location. An angular rotation of 0.2° at 150 m corresponds to 0.5 m in absolute distance at that range. Thus, in these known mechanical scanning LIDAR systems, pulse averaging obviously cannot be accomplished at maximum desired distance for slender objects, such as a person.

In contrast to these know MEMS based scanning LIDAR systems, the LIDAR systems and method of operation according to the present teaching can perform pulse averaging at maximum desired distances and, therefore, the amount of pulse averaging and firing patterns can be varied for each individual laser based on various criteria such as a calculated probability of detection, error rate, distance to objects measured for each laser, and/or environmental conditions.

EQUIVALENTS

While the Applicant's teaching is described in conjunction with various embodiments, it is not intended that the Applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A light detection and ranging (LIDAR) system comprising:
   a) an optical transmitter comprising a plurality of lasers, each of the plurality of lasers illuminating a field-of-view in at least a part of an illumination region;
   b) a transmitter controller having a plurality of electrical outputs, each of the plurality of electrical outputs of the transmitter controller being electrically connected to an input of one of the plurality of lasers, the transmitter controller being configured to generate electrical pulses at the plurality of electrical outputs so that the plurality of lasers generate light in a desired pattern in the illumination region;
   c) an optical receiver having an input comprising a field-of-view in the illumination region and comprising: a plurality of detectors, each having a part of the field-of-view in the illumination region and being positioned to detect light in the illumination region; and a time-of-flight measurement circuit that measures the time-of-flight of light from the plurality of lasers to the plurality of detectors, wherein the optical receiver calculates range information from the time-of-flight measurements; and
   d) an adaptive optical mirror positioned between the optical transmitter and the optical receiver and having a reflected region field-of-view in the illumination region, the optical mirror adjusting a location and a size of the reflected region field-of-view such that the reflected region field-of-view is smaller than the field-of-view of the input of the optical receiver and such that light of at least one of the plurality of lasers is selectively received to the optical receiver,
      wherein the field-of-view of at least some of the plurality of lasers is greater than the reflected region field-of-view of the adaptive optical mirror.

2. The light detection and ranging system of claim 1 wherein at least some of the plurality of lasers illuminates a region less than the field-of-view of at least some of the plurality of detectors.

3. The light detection and ranging system of claim 1 wherein the reflected region field-of-view of the adaptive optical mirror is different than the field-of-view of at least some of the plurality of detectors.

4. The light detection and ranging system of claim 1 wherein the reflected region field-of-view of the adaptive optical mirror is different than the field-of-view of each of the plurality of detectors.

5. The light detection and ranging system of claim 1 wherein the field-of-view of at least some of the plurality of detectors is greater than the reflected region field-of-view of the adaptive optical mirror.

6. The light detection and ranging system of claim 1 wherein the field-of-view of each of the plurality of detectors is greater than the reflected region field-of-view of the adaptive optical mirror.

7. The light detection and ranging system of claim 1 wherein the field-of-view of at least some of the plurality of detectors is less than the reflected region field-of-view of the adaptive optical mirror.

8. The light detection and ranging system of claim 1 wherein a ratio of the reflected region field-of-view of the adaptive optical mirror to the field-of-view of at least some of the plurality of lasers is chosen to achieve a particular resolution of the light detection and ranging system.

9. The light detection and ranging system of claim 1 wherein a ratio of the reflected region field-of-view of the adaptive optical mirror to the field-of-view of at least some of the plurality of lasers is chosen to achieve a particular dynamic range of the light detection and ranging system.

10. The light detection and ranging system of claim 1 wherein a ratio of the reflected region field-of-view of the adaptive optical mirror to the field-of-view of at least some of the plurality of lasers is chosen to achieve a particular resolution.

11. The light detection and ranging system of claim 1 wherein a ratio of the reflected region field-of-view of the adaptive optical mirror to the field-of-view of at least some of the plurality of detectors is chosen to achieve a particular signal-to-noise ratio of the light detection and ranging system.

12. The light detection and ranging system of claim 1 wherein a ratio of the reflected region field-of-view of the adaptive optical mirror to the field-of-view of all of the plurality of detectors is chosen to achieve a particular signal-to-noise ratio of the light detection and ranging system.

13. The light detection and ranging system of claim 1 wherein a number of the plurality of detectors is less than a number of the plurality of lasers.

14. The light detection and ranging system of claim 1 wherein the reflected region field-of-view of the adaptive optical mirror is configured to be less than a size of the desired pattern in the illumination region.

15. The light detection and ranging system of claim 1 wherein the adaptive optical mirror comprises MEMS.

16. The light detection and ranging system of claim 1 wherein the adaptive optical mirror comprises a digital micromirror.

17. The light detection and ranging system of claim 1 wherein at least two of the plurality of lasers emits light at different wavelengths.

* * * * *